United States Patent
Sampath et al.

(10) Patent No.: US 9,402,193 B2
(45) Date of Patent: Jul. 26, 2016

(54) SYSTEMS, APPARATUS AND METHODS FOR INTERFERENCE MANAGEMENT IN WIRELESS NETWORKS

(75) Inventors: Ashwin Sampath, Skillman, NJ (US); Sundeep Rangan, Jersey City, NJ (US); Raja Sekhar Bachu, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 510 days.

(21) Appl. No.: 12/727,155

(22) Filed: Mar. 18, 2010

(65) Prior Publication Data
US 2010/0238901 A1    Sep. 23, 2010

Related U.S. Application Data

(60) Provisional application No. 61/161,643, filed on Mar. 19, 2009.

(51) Int. Cl.
*H04W 72/08*    (2009.01)
*H04W 24/02*    (2009.01)
*H04W 84/04*    (2009.01)

(52) U.S. Cl.
CPC .............. *H04W 24/02* (2013.01); *H04W 72/08* (2013.01); *H04W 72/082* (2013.01); *H04W 84/045* (2013.01)

(58) Field of Classification Search
USPC .......................................... 370/331; 455/509
See application file for complete search history.

(56) References Cited

U.S. PATENT DOCUMENTS

| 5,539,748 | A | 7/1996 | Raith |
| 6,493,331 | B1 | 12/2002 | Walton et al. |
| 6,906,667 | B1 | 6/2005 | Poilasne et al. |
| 7,362,726 | B2 | 4/2008 | Petrovic et al. |

(Continued)

FOREIGN PATENT DOCUMENTS

| CN | 1540899 A | 10/2004 |
| CN | 1543749 A | 11/2004 |

(Continued)

OTHER PUBLICATIONS

International Search Report and Written Opinion—PCT/US2010/028054, International Search Authority—European Patent Office—Jun. 28, 2010.

(Continued)

*Primary Examiner* — Hassan Phillips
*Assistant Examiner* — Omeed D Rahgozar
(74) *Attorney, Agent, or Firm* — Ashish L. Patel; Fariba Yadegar-Bandari

(57) ABSTRACT

Systems, apparatus, methods and computer program products are provided. In some embodiments, a method for facilitating interference management in an unplanned wireless communication system is provided. The method can include a non-serving base station obtaining information about a user equipment served by a serving base station; and determining signal information based, at least, in part, on the information. The method can also include the non-serving base station disallowing access to the user equipment due to restricted access rules for the non-serving base station. The method can also include the non-serving base station performing interference management of the user equipment served by the serving base station. The interference management can be performed based, at least, in part, on the determined signal information.

41 Claims, 21 Drawing Sheets

(56) References Cited

U.S. PATENT DOCUMENTS

| | | |
|---|---|---|
| 7,489,903 B2 | 2/2009 | Johansson et al. |
| 7,742,444 B2 | 6/2010 | Mese et al. |
| 8,155,023 B2 | 4/2012 | Vedantham et al. |
| 8,165,151 B2 | 4/2012 | Suo et al. |
| 8,432,786 B2 | 4/2013 | Li et al. |
| 2003/0003906 A1 | 1/2003 | Demers et al. |
| 2003/0117980 A1 | 6/2003 | Kim et al. |
| 2003/0185193 A1 | 10/2003 | Choi et al. |
| 2003/0194969 A1 | 10/2003 | Pan |
| 2003/0223396 A1 | 12/2003 | Tsai et al. |
| 2005/0041618 A1 | 2/2005 | Wei et al. |
| 2005/0053035 A1 | 3/2005 | Kwak et al. |
| 2005/0111405 A1 | 5/2005 | Kanterakis |
| 2005/0207374 A1 | 9/2005 | Petrovic et al. |
| 2005/0231433 A1 | 10/2005 | Nantz et al. |
| 2007/0004423 A1 | 1/2007 | Gerlach et al. |
| 2007/0176833 A1 | 8/2007 | Haho et al. |
| 2007/0280175 A1 | 12/2007 | Cheng et al. |
| 2007/0293260 A1 | 12/2007 | Xiao et al. |
| 2008/0019320 A1* | 1/2008 | Phan et al. ............ 370/331 |
| 2008/0049683 A1 | 2/2008 | Nakamata et al. |
| 2008/0194235 A1* | 8/2008 | Dalsgaard et al. ........ 455/411 |
| 2008/0232323 A1 | 9/2008 | Jeong et al. |
| 2008/0259873 A1 | 10/2008 | Ahmavaara et al. |
| 2008/0272889 A1 | 11/2008 | Symons |
| 2009/0017760 A1 | 1/2009 | Li et al. |
| 2009/0029663 A1 | 1/2009 | Saban et al. |
| 2009/0040972 A1 | 2/2009 | Robson et al. |
| 2009/0067387 A1 | 3/2009 | Pan |
| 2009/0109919 A1 | 4/2009 | Bertrand et al. |
| 2009/0135761 A1 | 5/2009 | Khandekar et al. |
| 2009/0196162 A1 | 8/2009 | Sambhwani et al. |
| 2009/0196271 A1 | 8/2009 | Song |
| 2009/0201863 A1 | 8/2009 | Pi |
| 2009/0207793 A1 | 8/2009 | Shen et al. |
| 2009/0285166 A1* | 11/2009 | Huber et al. ............ 370/329 |
| 2010/0035645 A1 | 2/2010 | Chang et al. |
| 2010/0062774 A1* | 3/2010 | Motegi et al. ............ 455/437 |
| 2010/0177741 A1 | 7/2010 | Zhang et al. |
| 2010/0227611 A1* | 9/2010 | Schmidt et al. ............ 455/434 |
| 2010/0238888 A1 | 9/2010 | Sampath et al. |
| 2010/0240382 A1 | 9/2010 | Sampath et al. |
| 2010/0315963 A1 | 12/2010 | Jading et al. |
| 2011/0261774 A1 | 10/2011 | Lunttila et al. |
| 2012/0093093 A1* | 4/2012 | Frenger et al. ............ 370/329 |

FOREIGN PATENT DOCUMENTS

| | | |
|---|---|---|
| CN | 1706141 A | 12/2005 |
| CN | 1852558 A | 10/2006 |
| CN | 1870452 A | 11/2006 |
| CN | 1906862 A | 1/2007 |
| CN | 1989775 A | 6/2007 |
| CN | 101128056 A | 2/2008 |
| CN | 101390422 A | 3/2009 |
| EP | 1475980 A1 | 11/2004 |
| EP | 1734773 A1 | 12/2006 |
| EP | 1926217 A2 | 5/2008 |
| JP | 2007074755 A | 3/2007 |
| JP | 2008529375 A | 7/2008 |
| KR | 20040030150 | 4/2004 |
| KR | 20070087099 A | 8/2007 |
| RU | 2115241 C1 | 7/1998 |
| RU | 2264036 | 11/2005 |
| WO | WO9406218 A1 | 3/1994 |
| WO | WO03017696 A1 | 2/2003 |
| WO | WO2005062798 A2 | 7/2005 |
| WO | WO2006016777 A2 | 2/2006 |
| WO | WO2006063642 A1 | 6/2006 |
| WO | WO2006079689 A1 | 8/2006 |
| WO | 2006099546 A1 | 9/2006 |
| WO | WO2006098665 | 9/2006 |
| WO | WO2007044281 | 4/2007 |
| WO | 2007049998 A1 | 5/2007 |
| WO | 2007108959 A1 | 9/2007 |
| WO | 2007147704 A1 | 12/2007 |
| WO | 2008042889 A1 | 4/2008 |
| WO | 2008053688 A1 | 5/2008 |
| WO | WO2008058551 A1 * | 5/2008 | ............ H04Q 7/36 |
| WO | 2008083804 A2 | 7/2008 |
| WO | 2008117202 A2 | 10/2008 |
| WO | 2009009459 A1 | 1/2009 |
| WO | 2009009608 A2 | 1/2009 |
| WO | 2009023587 A2 | 2/2009 |
| WO | 2009023604 A2 | 2/2009 |
| WO | 2009026162 A1 | 2/2009 |
| WO | WO2009126658 | 10/2009 |
| WO | WO2009129413 A2 | 10/2009 |

OTHER PUBLICATIONS

3GPP, "Universal Mobile Telecommunications System", User Equipement, Radio Transmission and reception, TS 25.101, Version 7.10.0, Release 7.
Roessler, "Cell search and cell selection in UMTS LTE", Application Note, Sep. 2009.
Zyern Jim. "Overview of the 3GPP LONG Term Evolution Physical Layer" white Paper. 27 pages.
Taiwan Search Report—TW099108241—TIPO—Feb. 10, 2014.
3GPP,"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, No. V8.7.0, Dec. 1, 2008, pp. 1-144.
3GPP,"3rd Generation Partnership Project; Technical Specification Group Radio Access Network; Evolved Universal Terrestrial Radio Access Network (E-UTRAN); X2 Application Protocol (X2AP) (Release 8); Excerpt pp. 1-14, 23-25, 38-42", 3GPP Standard; 3GPP TS 36.423, 3rd Generation Partnership Project (3GPP), Mobile Competence Centre ; 650, Route Des Lucioles ; F-06921 Sophia-Antipolis Cedex ; France, No. V8.5.0, Mar. 1, 2009, pp. 1-100.
Weber T et al., "Decentralized Interference Cancellation in Mobile Radio Networks," WCNC2007, 2007, pp. 2190-2194.
3GPP TS 136 300—V8.7.0—LTE; Evolved Universal Terrestrial Radio Access (E-UTRA) and Evolved Universal Terrestrial Radio Access Network (E-UTRAN); Overall description; Stage 2, 3GPP TS 36.300 version 8.7.0 Release 8, Jan. 28, 2009, Pges 1-47.
3GPP: "3rd Generation Partnership Project; Technical Specification Group Radio Access Network: UTRAN Iub interface Node B Application Part (NBAP) signalling (Release 7); 3GPP TS 24.433 V7.7.0" [online], Jan. 1, 2007, pp. 1,259-1,275,XP002525895.
3GPP: "3rd Generation Partnership Project; Technical Specification Group Radio Access Network; UTRAN Iur interface RNSAP signalling (Release 7); 3GPP TS 25.423 V7.7.0" [online] Jan. 1, 2007, pp. 1,185-1,191, 203-206, XP002525894.
Qualcomm Europe: "UTRAN enhancements for the support of inter-cell interference cancellation" 3GPP Draft; R3-080069 UTRAN Enhancements for the Support of Inter-Cell Interferencecancellation, 3rd Generation Partnership Project (3GPP), Mobile Competence Centre ; 650, Route Des Lucioles ; F-06921 Sophia-Antipolis Cedex ; France, no. Sorento, Italy; Feb. 4, 2008, XP050163302.

* cited by examiner

SYSTEMS, APPARATUS AND METHODS FOR INTERFERENCE MANAGEMENT IN WIRELESS NETWORKS

CLAIM OF PRIORITY

This application claims the benefit of U.S. Provisional Patent Application Ser. No. 61/161,643, titled "Network Listen for Interference Management for Home Node/eNode Base Stations," which was filed Mar. 19, 2009, and the entire contents of which are incorporated herein by reference.

CROSS-REFERENCE TO RELATED APPLICATIONS

This application is related to concurrently filed and commonly owned U.S. patent application Ser. No. 12/727,155, entitled "SYSTEMS, APPARATUS AND METHODS FOR INTERFERENCE MANAGEMENT IN WIRELESS NETWORKS,"; and U.S. patent application Ser. No. 12/727,163 entitled, "SYSTEMS, APPARATUS AND METHODS FOR INTERFERENCE MANAGEMENT IN WIRELESS NETWORKS,", the disclosures of which are hereby incorporated herein.

BACKGROUND

I. Field

The following description relates to wireless communications, in general, and to interference management in unplanned wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

In addition to conventional wireless multiple access communication systems, a new class of wireless multiple access communication systems employing BSs that cover small cell areas has emerged. These BSs can be installed in a home of a user and can provide indoor wireless coverage to UEs in or in geographic proximity to the home. Such personal miniature BS can be Femto BSs, Femto cells, Home Node B (HNB), Home eNode B (HeNB), or the like.

The BSs can operate according to restricted association, or closed subscriber group (CSG), methods whereby the owner of the home BS can determine which UEs are allowed to associate with the home BS. This is similar to, for example, 802.11 access points, wherein the wired equivalent privacy (WEP)/Wi-Fi protected access (WPA) key or explicit media access control (MAC) address provisioning can allow the owner of the access point to control access. Accordingly, UEs that are in geographic proximity to a BS, and have a radio link quality that would allow communication with the BS, could be prevented from such communication if the UE is not associated with the BS and/or within the subscriber group for the BS. The UEs can nonetheless cause interference to the BS when the UE transmits on the UL. Similarly, the UE is more susceptible to interference from the BS when the BS transmits on the DL to UEs with which the BS is associated. Accordingly, systems, apparatus and methods for interference management are desired.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with interference management in wireless communication systems.

According to related aspects, a method is provided. The method can include: obtaining information about a UE served by a serving BS; and determining signal information based, at least, in part, on the information.

In another aspect, a computer program product including a computer-readable medium is provided. The computer program product can include: a first set of codes for causing a computer to obtain information about a UE served by a serving BS; and a second set of codes for causing the computer to determine signal information based, at least, in part, on the information, wherein a non-serving BS includes the computer.

According to another aspect, an apparatus is provided. The apparatus can include means for obtaining information about a UE served by a serving BS; and means for determining signal information based, at least, in part, on the information.

According to another aspect, another apparatus is provided. The apparatus can include obtain information about a UE served by a serving BS; and determine signal information based, at least, in part, on the information.

In another aspect, another method is provided. The method can include: determining information about a UE, wherein the UE is served by a serving BS; and employing determined information about the UE to perform interference management at a non-serving BS.

In another aspect, a computer program product including a computer-readable medium is provided. The computer program product can include a computer-readable medium, comprising: a first set of codes for causing a computer to determine information about a UE, wherein the UE is served by a serving BS; and a second set of codes for causing a computer to employ determined information about the UE to perform interference management at the computer, wherein a non-serving BS includes the computer.

In another aspect, another apparatus is provided. The apparatus can include: means for determining information about a UE, wherein the UE is served by a serving BS; and means for employing determined information about the UE to perform interference management at the apparatus.

In another aspect, another apparatus is provided. The apparatus can include a non-serving BS configured to: determine information about a UE, wherein the UE is served by a serving BS; and employ determined information about the UE to perform interference management at the non-serving BS.

In another aspect, another method is provided. The method can include: synchronizing a BS 604 downlink subframe to a BS 602 downlink subframe, wherein the BS 602 downlink subframe is transmitted from a serving BS to a UE served by the serving BS; decoding one or more control channel symbols of the BS 602 downlink subframe, wherein gating of one or more data channel symbols of the BS 604 downlink subframe is performed prior to the decoding; and determining information for performing interference management associated with the UE, wherein determining information is based, at least, in part, on the decoding one or more symbols of the BS 602 downlink subframe.

In another aspect, a computer program product including a computer-readable medium is provided. The computer program product can include a computer-readable medium, comprising: a first set of codes for causing a computer to synchronize a BS 604 downlink subframe to a BS 602 downlink subframe, wherein the BS 602 downlink subframe is transmitted from a serving BS to a UE served by the serving BS; a second set of codes for causing the computer to decode one or more control channel symbols of the BS 602 downlink subframe, wherein gating of one or more data channel symbols of the BS 604 downlink subframe is performed prior to the decoding; and a third set of codes for causing the computer to determine information for performing interference management associated with the UE, wherein determining information is based, at least, in part, on decoding one or more symbols of the BS 602 downlink subframe.

In another aspect, another apparatus is provided. The apparatus can include: means for synchronizing a BS 604 downlink subframe to a BS 602 downlink subframe, wherein the BS 602 downlink subframe is transmitted from a serving BS to a UE served by the serving BS; means for decoding one or more control channel symbols of the BS 602 downlink subframe, wherein gating of one or more data channel symbols of the BS 604 downlink subframe is performed prior to the decoding; and means for determining information for performing interference management associated with the UE, wherein determining information is based, at least, in part, on the decoding one or more symbols of the BS 602 downlink subframe.

In another aspect, another apparatus is provided. The apparatus can include a non-serving BS configured to: synchronize a BS 604 downlink subframe to a BS 602 downlink subframe, wherein the BS 602 downlink subframe is transmitted from a serving BS to a UE served by the serving BS; decode one or more control channel symbols of the BS 602 downlink subframe, wherein gating of one or more data channel symbols of the BS 604 downlink subframe is performed prior to the decoding; and determine information for performing interference management associated with the UE, wherein determining information is based, at least, in part, on decoding one or more symbols of the BS 602 downlink subframe.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
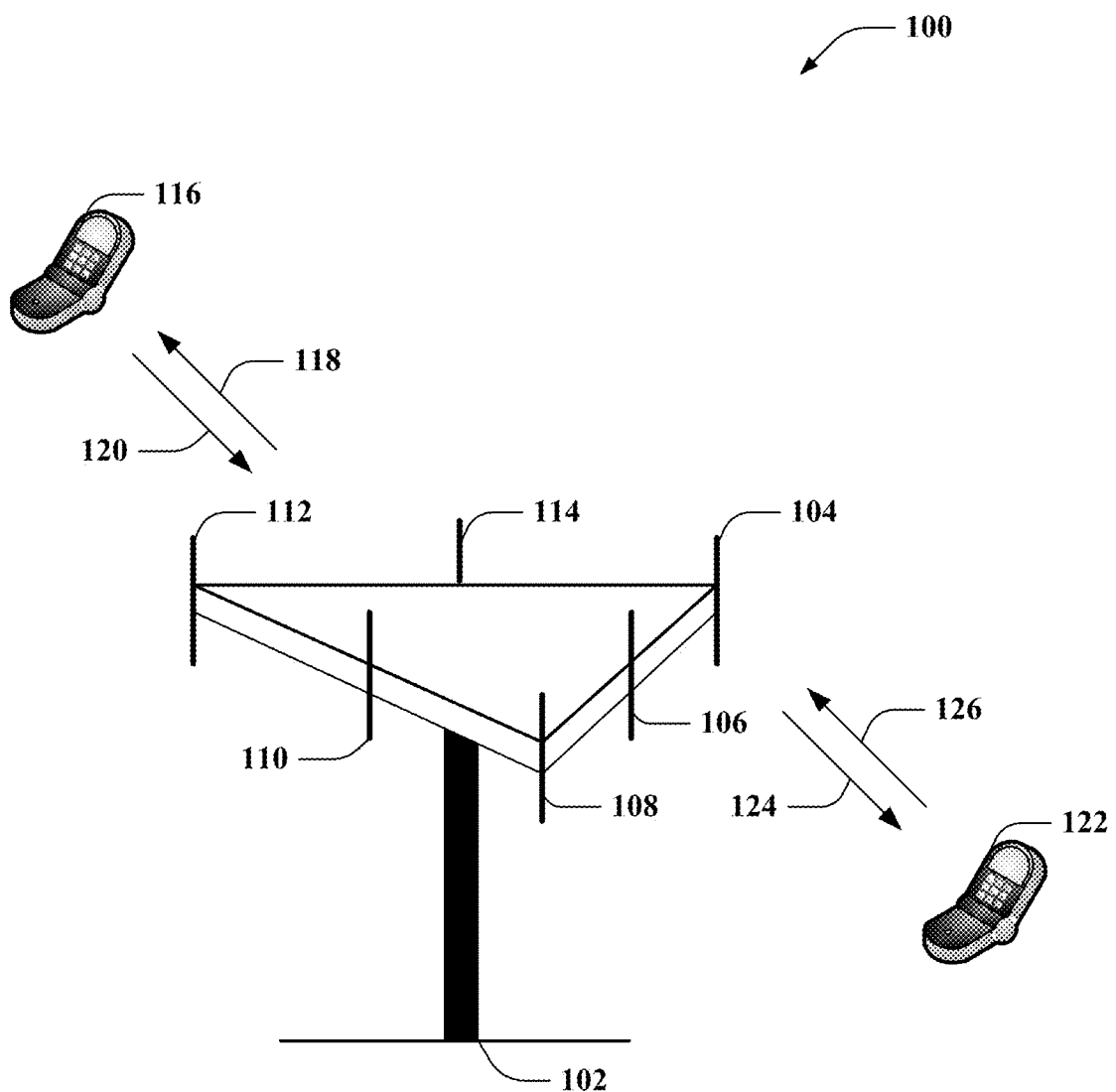
FIG. 1 is an illustration of an example wireless communication in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between one or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers interim standard 8020 (IS-8020), interim standard 95 (IS-95) and interim standard 856 (IS-856). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the UL. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless local area network (wireless LAN), BLUETOOTH and any other short- or long-range, wireless communication techniques.

SC-FDMA utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in UL communications where lower PAPR greatly benefits UEs in terms of transmit power efficiency. Accordingly, SC-FDMA is implemented as an UL multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point, BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., erasable programmable read only memory (EPROM), card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, access point, eNodeB, macro cell, and so on. Also, a Femto node may be configured or referred to as a Home NodeB, Home eNodeB, access point access node, a BS, a Femto cell, and so on.

FIG. 1 is an illustration of an example wireless communication system in accordance with various aspects set forth herein. In wireless communication system 100, interference caused by transmissions on the UL can be managed by the BS 102.

Referring now to FIG. 1, a wireless communication system 100 is illustrated in accordance with various embodiments presented herein. Wireless communication system 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs.

Figure 2:
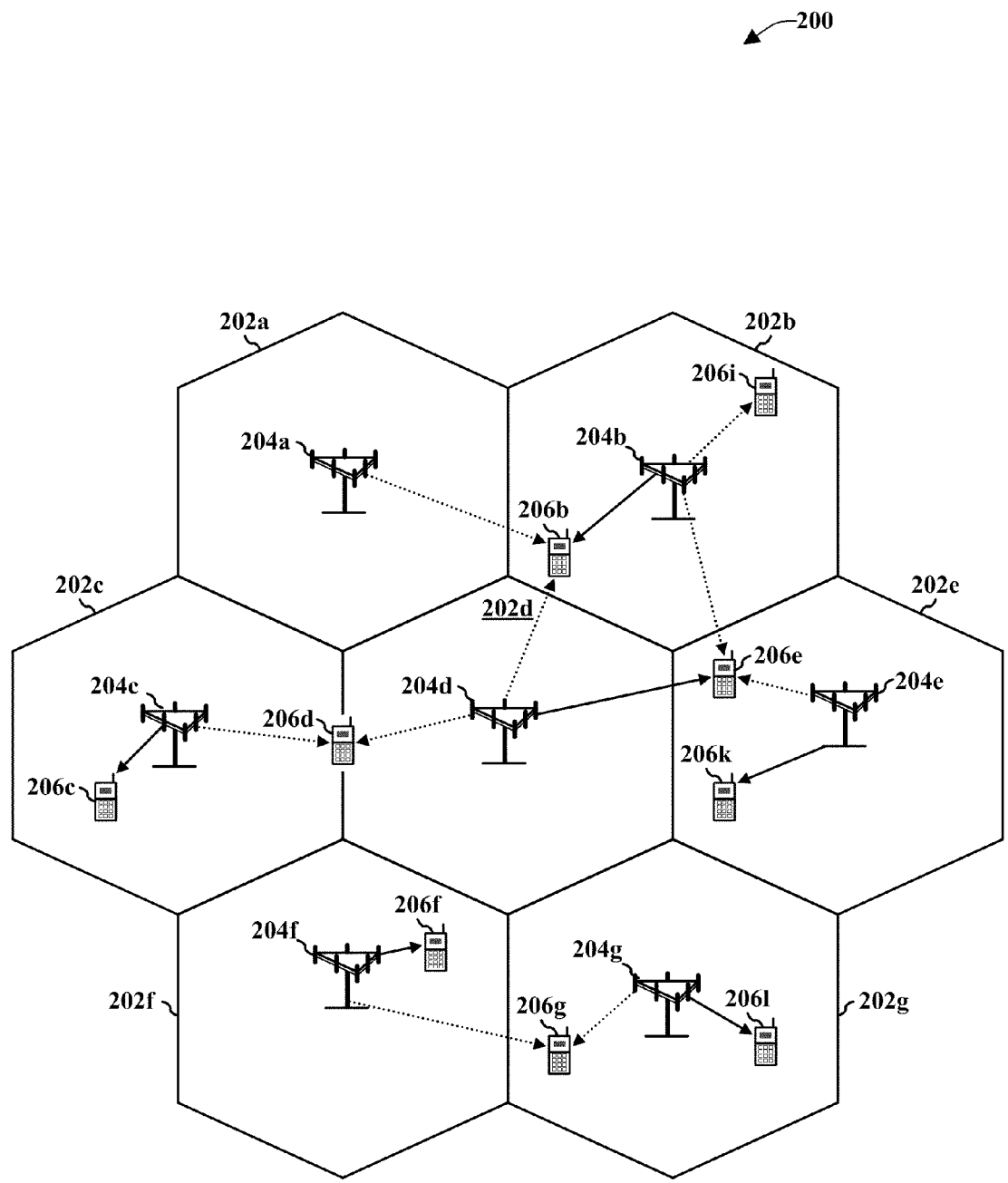
FIG. 2 is an illustration of another example wireless communication system in accordance with various aspects set forth herein.

FIG. 2 is an illustration of another example wireless communication system in accordance with various aspects set forth herein. The wireless communication system 200 provides communication for multiple cells, such as, for example, macro cells 202a-202g, with each cell being serviced by a corresponding BS (e.g., BSs 204a-204g). As shown in FIG. 2, UEs (e.g., UEs 206a-206l) can be dispersed at various locations throughout the system over time. Each of the UE 206 can communicate with one or more BSs 204a-204g on a DL or an UL at a given moment, depending upon whether the UE 206 is active and whether it is in soft handover, for example. The wireless communication system 200 may provide service over a large geographic region. For example, macro cells 202a-202g may cover a few blocks in a neighborhood.

Figure 3:
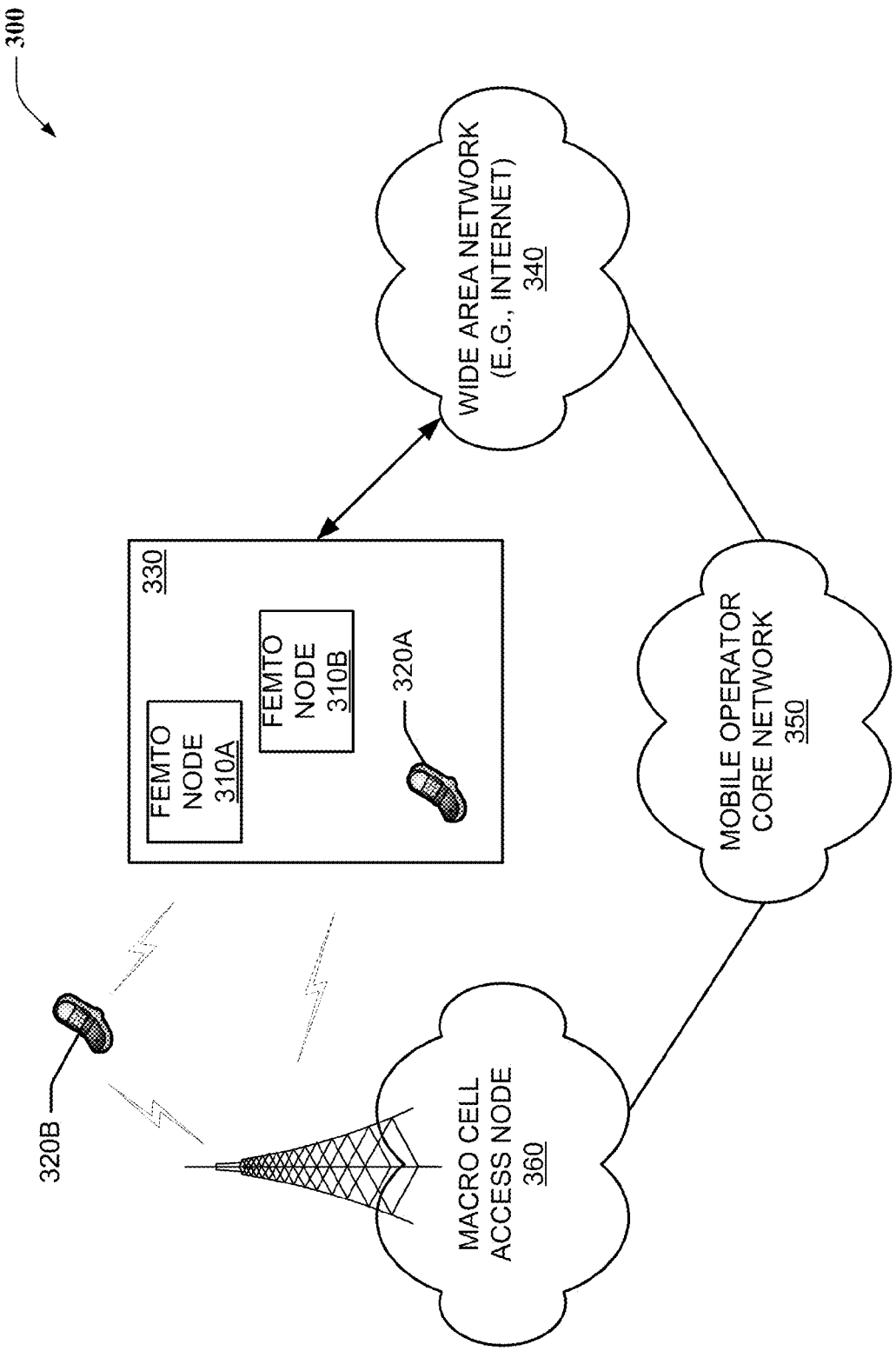
FIG. 3 is an illustration of an example wireless communication system where one or more Femto nodes are deployed in accordance with various aspects set forth herein.

FIG. 3 is an illustration of an example wireless communication system where one or more Femto nodes are deployed in accordance with various aspects set forth herein. Specifically, the wireless communication system 300 includes multiple Femto nodes (e.g., Femto nodes 310A and 310B) installed in a relatively small scale network environment (e.g., in one or more user residences 330). One or more of the Femto nodes 310A, 310B can be coupled to a wide area network 340 (e.g., the Internet) and a mobile operator core network 350 via a digital subscriber line (DSL) router, a cable modem, a wireless link, or other connectivity means (not shown). As will be discussed below, the Femto nodes 310A, 310B can be configured to serve associated UEs (e.g., UE 320A) and, optionally, alien UEs (e.g., UE 320B). For example, access to one or more Femto nodes 310A, 310B may be restricted whereby one of the UEs 320A, 320B can be served by one or more Femto nodes 310A, 310B that are designated for the UEs 320A, 320B (e.g., a home Femto node) but cannot be served by any Femto nodes 310A, 310B that are not designated for the UEs 320A, 320B (e.g., a neighbor's Femto node).

However, in various embodiments, an associated UE 320A can experience interference on the DL from a Femto node 310A serving an alien UE 320B. Similarly, a Femto node 310B associated with associated UE 320A can experience interference on the UL from the alien UE 320B. In embodiments, interference management can be facilitated in the wireless communication system 300 as described herein.

Figure 4:
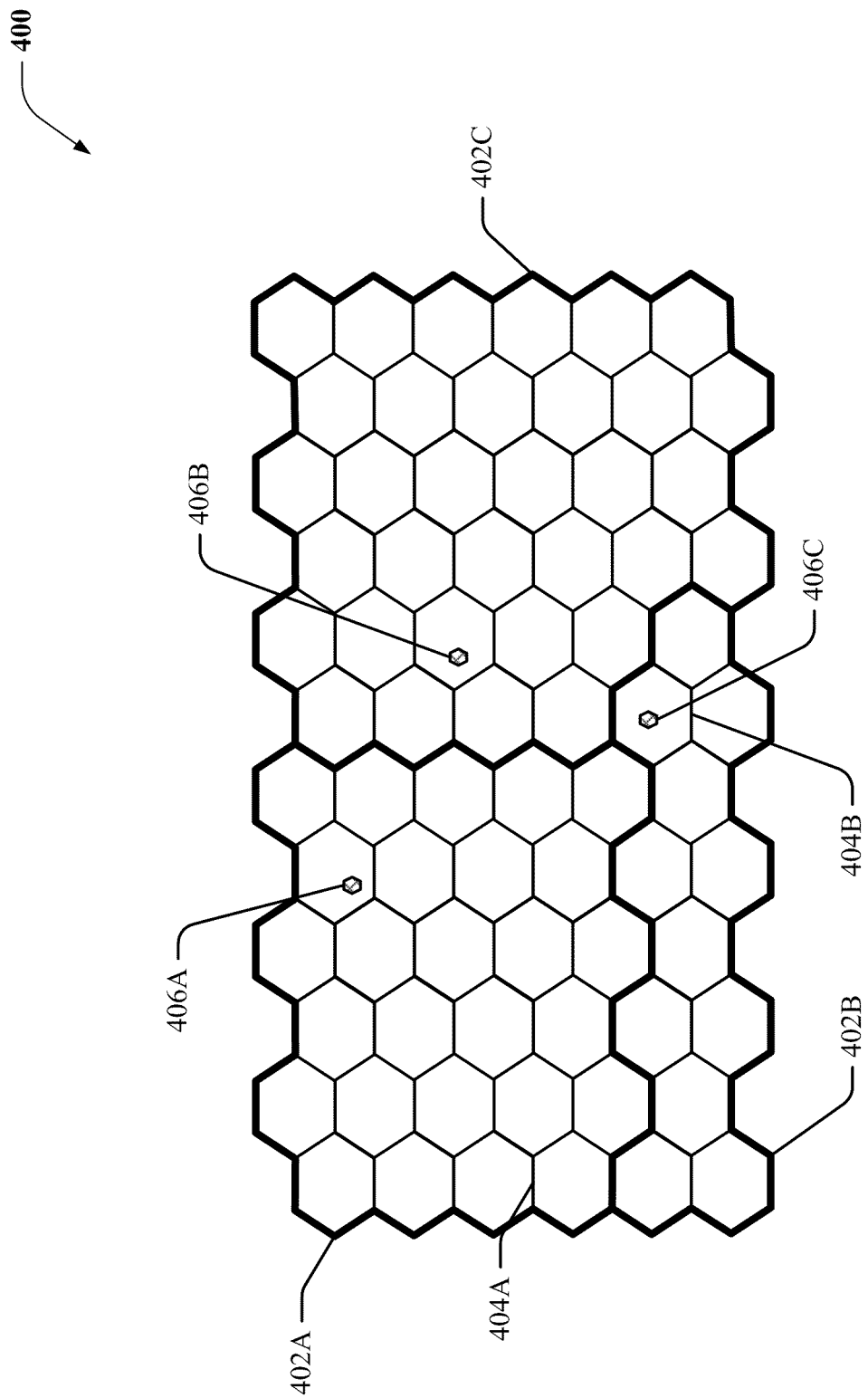
FIG. 4 is an illustration of an example coverage map in a wireless communication system in accordance with various aspects set forth herein.

FIG. 4 is an illustration of an example coverage map in a wireless communication system providing configuration of scheduling policy for facilitating distributed scheduling in accordance with various aspects set forth herein. The coverage map 400 can include tracking areas 402A, 402B, 402C (or routing areas or location areas), each of which can include several macro coverage areas. In the embodiment shown, areas of coverage associated with tracking areas 402A, 402B, 402C are delineated by the wide lines and the macro coverage areas 404A, 404B are represented by the hexagons. The tracking areas 402A, 402B, 402C can include Femto coverage areas 406A, 406B, 406C. In this example, each of the Femto coverage areas 406A, 406B, 406C is depicted within a macro coverage area 404A, 404B, 404C. It should be appreciated, however, that a Femto coverage area 406A, 406B, 406C may not lie entirely within a macro coverage area 404A, 404B, 404C. In practice, a large number of Femto coverage areas 406A, 406B, 406C can be defined with a given tracking area 402A, 402B, 402C or macro coverage area 404A, 404B. Also, one or more Pico coverage areas (not shown) can be defined within a tracking area 402A, 402B, 402C or macro coverage area 404A, 404B, 404C.

Referring again to FIG. 3, the owner of a Femto node 310A can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by a macro cell access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro cell access node 360 and when the subscriber is at home, he is served by Femto node 310A. Here, it should be appreciated that a Femto node 310 may be backward compatible with UEs 320 that are existing at the time of manufacture and/or design of the Femto node 310.

A Femto node 310 may be deployed on a single frequency or, in the alternative, on multiple frequencies. Depending on the particular configuration, the single frequency or one or more of the multiple frequencies can overlap with one or more frequencies used by the macro cell access node 360.

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the Femto node 310 in the user residence.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a CSG Home NodeB) is one that provides service to a restricted provisioned set of UEs. This set may be temporarily or permanently extended as necessary. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

Figure 5:
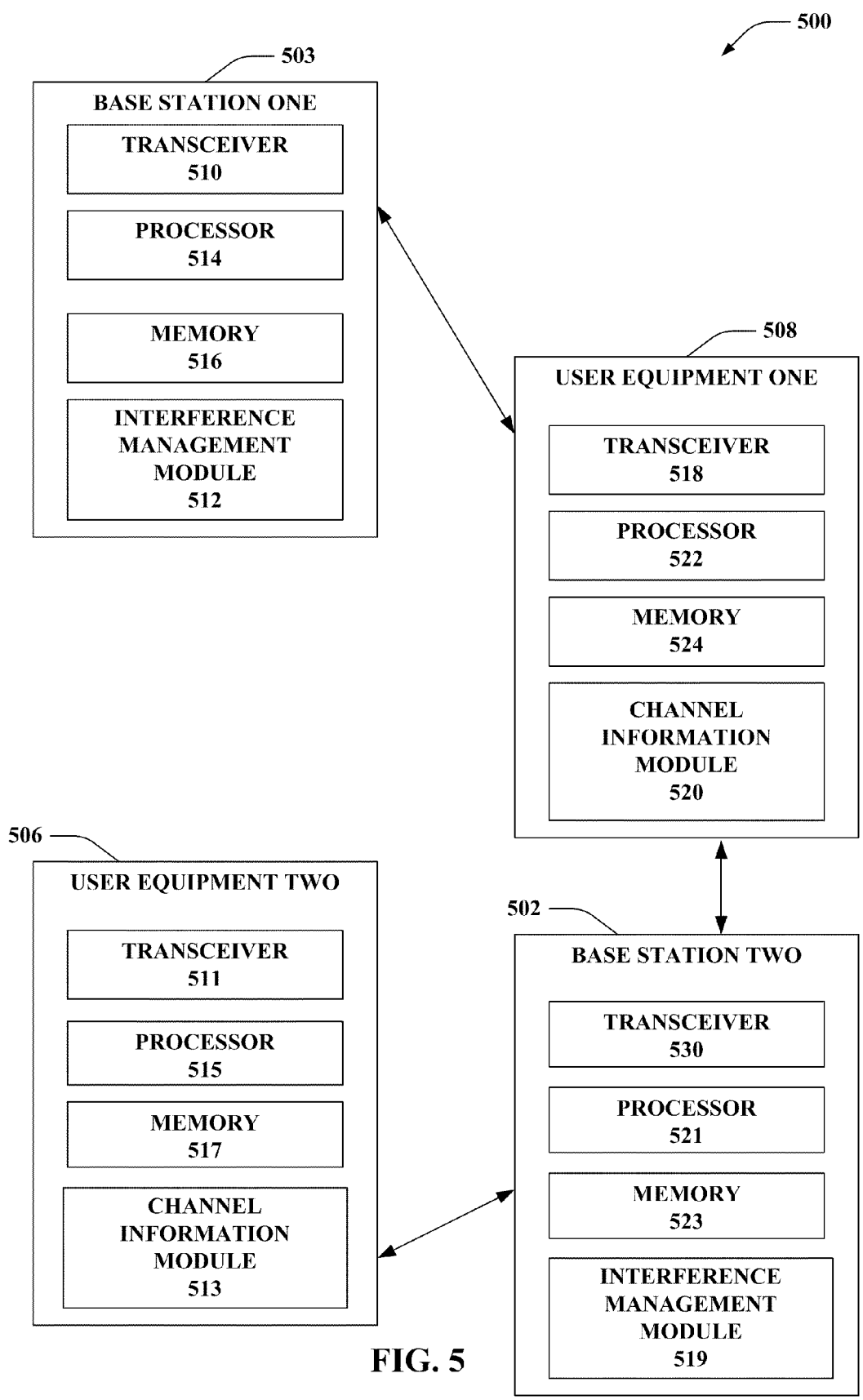
FIGS. 5 and 6A are illustrations of example block diagrams of a wireless communication system for facilitating interference management in accordance with various aspects set forth herein.

FIG. 5 is an illustration of an example block diagram of a wireless communication system for facilitating interference management in accordance with various aspects set forth herein.

The wireless communication system 500 can include one or more BSs 502, 503 in respective cells of wireless communication system 500, and at least one BS configured to perform one or more of the network listening and/or interference management methods described herein. In some embodiments, one or more of BSs 502, 503 can be Femto access nodes configured to provide communication to and from a UE in the Femto cell managed by the Femto access node. For example, the Femto access nodes can be Femto Node Bs. By way of example, but not limitation, in various embodiments, the Femto node Bs can be UMTS HNBs or LTE HeNB.

In some embodiments, the BSs 502, 503 can be BSs located in one or more different Femto cells. The interference management modules 512, 519 can cause the BSs 502, 503 to perform one or more network listening methods and/or interference management methods described herein. In one or more embodiments, interference management, as discussed in greater detail below, can include, but is not limited to, interference avoidance, power control, cancellation of soft symbols, cancellation of symbols mapped to constellation points, full cancellation (which can include decoding and canceling), treating highly interfered symbols as erasures, and any other interference mitigation technique.

The BSs 502, 503 can include processors 514, 521. Processors 521, 514 can be configured to perform one or more of the network listening functions and/or interference management functions described herein with reference to any of the systems, methods, apparatus and/or computer program products. In various embodiments, the processors 521, 514 can be implemented as hardware and/or software.

The BSs 502, 503 can include memory 523, 516. The memory 523, 516 can be for storing computer-executable instructions and/or information for performing the functions described herein with reference to any of the systems, methods, apparatus and/or computer program products.

The BSs 502, 503 can include transceivers 510, 530. Transceivers 510, 530 can be configured to transmit and/or receive signaling information, configuration information, control information, data and/or any other information generated or received to employ network listening for interference management as described herein.

The wireless communication system 500 can also include one or more UEs 508, 506 in respective cells of wireless communication system 500. At least one of the one or more UEs 508, 506 can be located near a Femto cell of a BS to which the UE is not associated but to which the UE causes interference. For example, UE 508 can be located within geographic proximity to BS 502. UE 508 can be serviced by BS 503 but cause interference to BS 502 when the UE 508 is in close geographic proximity to BS 502. As such, BS 502 can employ network listening methods for facilitating management of the interference caused by UE 508.

In various embodiments, the UEs 508, 506 can be UEs serviced by UMTS HNBs or LTE HeNBs and/or UEs 508, 506 in UMTS or LTE systems.

The UEs 508, 506 can include processors 522, 515. Processors 522, 515 can be configured to perform coordination information signaling and/or data or control information processing, transmission and/or reception. In various embodiments, coordination information signaling can be used for handover purposes and for numerous other purposes other than handover. In various embodiments, coordination signaling can include, but is not limited to, handover signaling or any type of signaling for coordinating communications between the BSs 502, 503. Generally, the systems, methods, apparatus and/or computer program products described herein can employ network listening and/or interference management.

The UEs 508, 506 can include memory 524, 517. The memory 524, 517 can be for storing computer-executable instructions and/or information for performing the functions described herein with reference to any of the systems, methods, apparatus and/or computer program products.

The UEs 508, 506 can include transceivers 518, 511. Transceivers 518, 511 can be configured to transmit and/or receive coordination information signaling, including, but not limited to handover signaling, and/or any other a number of other types of data or control information.

Figure 6A:
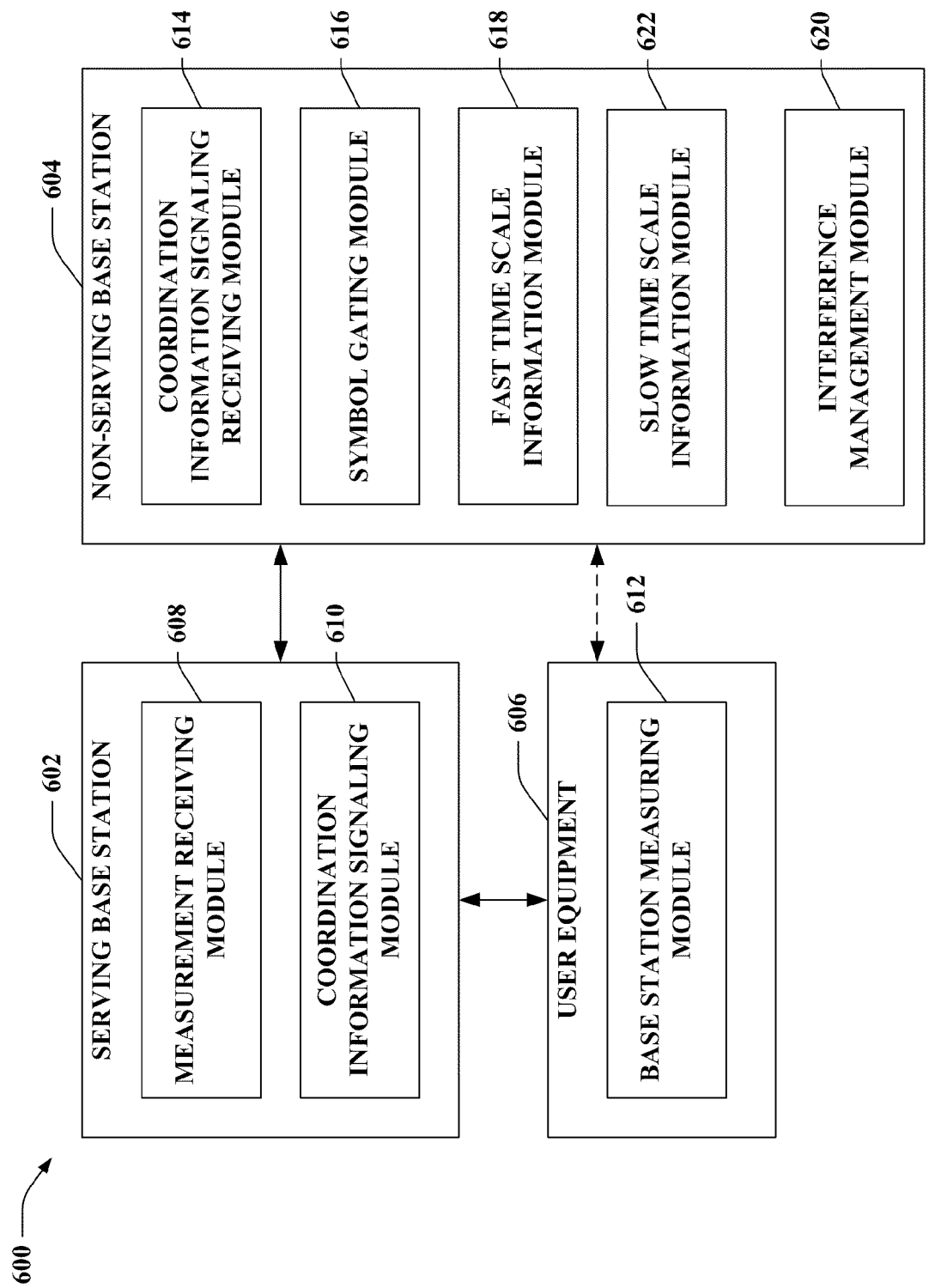

FIG. 6A illustrates another block diagram of an example system for facilitating interference management in a wireless network. BSs 602 and 604 can communicate with a UE 606 (or other wireless devices) to provide network access thereto. In one example, the UE 606 can receive wireless network access from the BS 602, and the BS 604 can be a restricted association BS that is inaccessible by the UE 606. The BS 602 can include a measurement receiving module 608 that can receive a BS measurement and a coordination information signaling module 610 that can transmit coordination information signaling to a BS based, at least, in part on the measurement. The UE 606 can comprise a BS measuring module 612 that can conduct the measurement of the BS.

BS 604 can comprise a coordination information signaling receiving module 614 that can obtain coordination information signaling from one or more BSs or related devices, a symbol gating module 616 that can gate one or more symbols transmitted from the BS 604 to enable the BS 604 to listen to transmissions between the BS 602 and the UE 606. The BS 604 can listen for and/or determine information related to UL assignments associated with the UE 606, for example. The BS 604 can also include a fast time scale information module 618 and a slow time scale information module 622 that can receive, obtain or derive information about the UE 606 for performing interference management, as discussed in greater detail below. The BS 604 can also include an interference management module 620 that can cancel or avoid interference or perform any number of other reception or other techniques for mitigating the effects of the interference from the UE 606.

In one example, the BS measuring module 612 can measure information transmitted from BS 604 to determine a signal strength, for example, or other measurement. The UE 606 can transmit the measurement to the BS 602, which can be received by the measurement receiving module 608. Based on the measurement, the coordination information signaling module 610 can determine whether to transmit coordination information signaling to the BS 604.

The coordination information signaling can comprise one or more parameters (e.g., slow time scale information) related to the UE 606. For example, in UMTS systems, the slow time scale information can include, but is not limited to, a scrambling code used by the UE 606, and/or configuration of UL channels (e.g., UL dedicated physical channel (DPCH), enhanced dedicated physical channel (E-DPCH)). As another example, for LTE system, the slow time scale information can include a cell radio network temporary identifier (C-RNTI), persistent assignment information (e.g., resource blocks (RBs), periodicity modulation, code rate, and/or hopping) and/or physical channel configuration information (e.g., for a physical uplink control channel (PUCCH), physical uplink shared channel (PUSCH), sounding reference signal (SRS)). In some embodiments, the C-RNTI can be a 16-bit identifier assigned to the UE 606 by the BS 602. The coordination information signaling receiving module 614 and/or the slow time scale information module 622 can obtain the coordination information signaling from the BS 602 and determine the slow time scale information.

The slow time scale information exchange can be performed using the existing measurement, measurement reporting and/or existing or new coordination information signaling mechanisms in some embodiments. In some embodiments, the slow time scale information exchange can be performed by augmenting handover messages as outlined and/or in response to the messages.

In UMTS systems, UE 606 can be served by a macro Node B, which can be BS 602. UE 606 can make DL measurements on BS 604 and report (either periodically or in an event-based fashion) to BS 602. BS 602 can process the reports and apply a coordination information algorithm to trigger signaling between BS 602 and BS 604. For example, in one embodiment, the signaling can include, but is not limited to, soft handover signaling. In particular, in some embodiments, over the Iub and/or Iur interfaces, a RadioLinkSetupRequest/Response message can be transmitted. The message can contain information pertaining to the UE 606 that has requested an Active Set Add. Although, the BS 604 will not add the UE 606 upon receiving the RadioLinkSetupRequest message from the BS 602, the BS 604 will have the information necessary to detect and, for example, cancel or avoid the signal of UE 606 and/or conduct power control to otherwise combat the effects of interference from the UE 606. For example, the RadioLinkSetupRequest/Response message, the Active Set Add message and the RadioLinkSetupRequest message can be as specified in the 3GPP TS 25.423 specification and the 3GPP TS 25.433 specification.

In these embodiments, the UMTS protocol can be specified such that the target BS, or BS 604, will not send the RadioLinkSetupResponse message. The UMTS specification for BSs can be modified so that if the BS 604 is a CSG BS (and therefore operates according to restricted association with only specified UEs) and the BS 604 determines that the UE 606 indicated in the RadioLinkSetupRequest message is not allowed to access the BS 604, then a RadioLinkSetupResponse message is not transmitted from the BS 604.

Another modification to the UMTS protocol can include the measurements being made by the UE 606 only, and the UE 606 making measurements on the BSs that the UE 606 is not allowed to access.

In LTE systems, the UE 606 can be connected to the BS 602 and make DL measurements on the BS 604. The UE 606 can report those measurements to the BS 602. The BS 602 can process the report and apply a coordination information algorithm. The coordination information algorithm can trigger handover or other BS coordination signaling over the X2/S1 interface to the BS 604. In embodiments wherein the coordination information algorithm triggers handover signaling, even though the handover is not allowed due to the UE 606 being restricted from connecting to the BS 604, the information pertaining to the UE 606 is still received by the BS 604. The BS 604 can utilize the information pertaining to the UE 606 to avoid and/or cancel the interference from the UE 606.

Regarding the X2 interface, as detailed in 3GPP TS 36.423, the Handover Request message can be used by the source BS, or BS 602, to prepare the target BS, or BS 604, to accept connection with UE 606. In some embodiments, this message can contain an information element called RRCContext, which can map to an RRC Handover Preparation Information message as detailed in 3GPP TS 36.331 Section 10.2.3. The Handover Preparation Information message can include an AS Configuration information element that can include all the information pertaining to the UE 606 including, but not limited to, the C-RNTI, a RadioResourceConfigDedicated message, which can include slow time scale information that can be employed by the target BS, or BS 604, to perform avoidance, cancellation and/or other interference mitigation of the UE 606 signal. If, in response to the Handover Request message, the target BS, or the BS 604, does not respond with a Handover Acknowledgement message, then the handover will not be executed. Accordingly, in these embodiments, the target BS, or BS 604, can obtain all of the information typically obtained during the handover without accepting handover of the UE 606. In other embodiments wherein any type of coordination signaling is exchanged between BS 602 and BS 604, the target BS, or BS 604, can obtain the information typically obtained for coordination of communication with the UE 606 but need not allow access to the BS 604 by the UE 606. The information can be utilized to avoid or cancel the interference from the UE 606.

In some embodiments, the UMTS protocol can be modified such that UEs are allowed to make and report measurements on BSs to which the UE is not allowed to connect. The source BSs can be allowed to initiate a Handover Request message or equivalent or similar message to target BSs for which the UE is restricted from communicating. The target BSs can receive the Handover Request message and determine that the indicated UE is not allowed to connect to the target BS. The target BS can nonetheless process the Handover Request message but not transmit a Handover Acknowledgment message to the source BS, which transmitted the Handover Request message. Accordingly, for UMTS, coordination information signaling on the backhaul can be used to convey information to a BS about the interfering signal of the UE. This information can be conveyed even though the target BS will not allow the UE to connect to it.

In some embodiments, an LTE system can be specified such that the PUCCH and a PUSCH can be transmitted together, such as in a same subframe. In these embodiments, an UL assignment for the UE 606 (including RBs assigned, transport format on accompanying PUSCH data, etc.) can be reflected in the UL transmission for LTE systems.

Figure 6B:
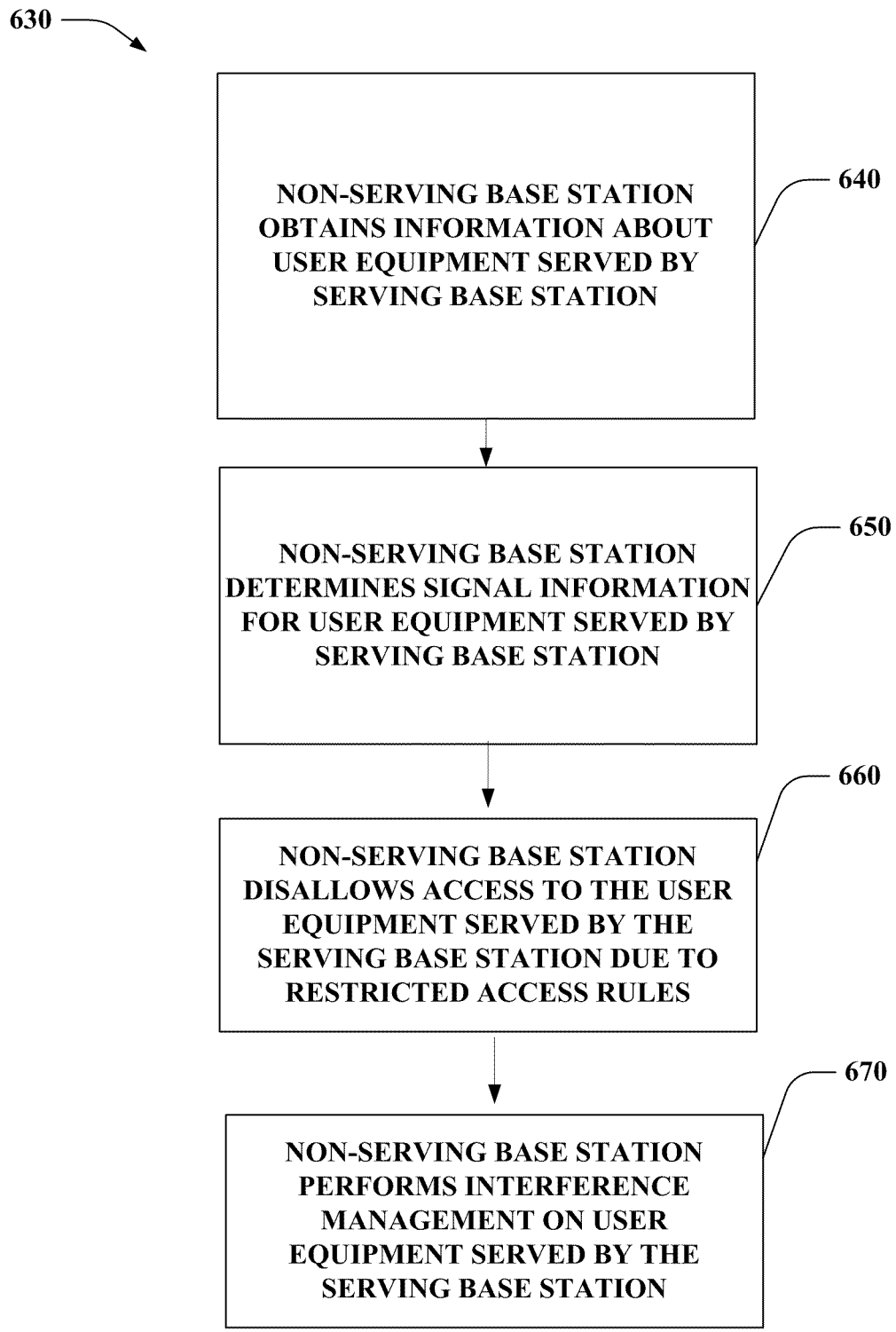
FIG. 6B is an illustration of a flowchart of a method for facilitating interference management in accordance with various aspects set forth herein.

The foregoing is a method using existing coordination information signaling to provide the slow time scale information to BS 604 for managing the interference of UE 606. However, other methods employing slow time scale information can also be employed, as will be now discussed.

is a flow chart of an example of another method employing slow time scale information for facilitating interference management in accordance with various aspects set forth herein. FIG. 6B will be described with reference to FIGS. 6A and 6B.

At 640, method 630 can include BS 604 obtaining information about UE 606. As noted above, UE 606 can be served by BS 602. Further, UE 606 can be restricted from accessing BS 602 due to restricted access rules employed by BS 602.

In some embodiments, the information obtained by BS 604 is slow time scale information. The slow time scale information can be provided in coordination information signaling, which can include, but is not limited to, signaling for handover purposes and for other purposes including, but not limited to, power control.

In some embodiments, for UMTS systems, the slow time scale information can be a scrambling code used by the UE 606, UL channel configuration information for the UE 606. The information can be transmitted to the UE 606 from the BS 602. Further, in some embodiments, the UL channel configuration information can include an UL DPCH or an E-DPCH.

In some embodiments, for UMTS systems, the slow time scale information can include a C-RNTI associated with the UE 606, persistent assignment information for the UE 606, DPCH configuration information about the UE 606 or a number of control channel symbols being used by the serving BS 602. The persistent assignment information for the UE 606 can include, but is not limited to, assigned RBs, information indicative of periodicity of a persistent assignment associated with the UE 606, information indicative of modulation used in a persistent assignment associated with the UE 606, information indicative of a coding rate applicable to a persistent assignment associated with the UE 606 and information indicative of hopping of the persistent assignment associated with the UE 606. In some embodiments, the DPCH configuration information about the UE 606 includes: a PUCCH, a PUSCH or an SRS.

The slow time scale information can be obtained by the BS 604 in at least two general cases. First, in response to the BS 602 receiving, from the UE 606, a measurement report about BS 604. The measurement report can include at least one of: received signal strength indicator measurements, reference signal received power measurements or reference signal received quality measurements. The slow time scale information can be sent to the BS 604 if the measurement report is indicative of at least one of the received signal strength indicator measurements, reference signal received power measurements or reference signal received quality measurements being greater than a threshold.

Second, the slow time scale information can be obtained by the BS 604 upon the initiation of the BS 604. For example, if the UE 606 attempts to connect to the BS 604, BS 604 can take steps to initiate acquisition of the slow time scale information.

At 650, method 630 can include the BS 604 determining signal information for the UE 606. The signal information can be determined based, at least, in part, on the slow time scale information.

At 660, method 630 can include the BS 604 disallowing access to the UE 606 due to restricted access rules for the non-serving BS. Nonetheless, at 670, method 630 can also include the BS 604 performing interference management of the interference from the UE 606. The interference management can be performed based, at least, in part, on the determined signal information for the UE 606.

Performing interference management can include interference avoidance, cancellation, power control, erasures of symbols deemed interfered with, and other mitigation techniques.

For example, in some embodiments, performing interference management comprises at least one of: canceling an UL signal transmitted from the UE 606, scheduling transmission of a signal on a carrier different than a carrier on which an UL signal is scheduled from the UE 606 or performing power control for a UE served by BS 604 (such as UE 506 when BS 604 is BS 502 of FIG. 5).

In some embodiments, performing interference management comprises: demodulating and decoding, by BS 604, a DPCCH or E-DPCCH to determine a TFCI or E-TFCI of an accompanying DPDCH or E-PDCH.

In some embodiments, performing interference management comprises: demodulating and decoding, by BS 604, a DPCCH or E-DPCCH to determine a TFCI or E-TFCI of an accompanying DPDCH or E-DPDCH; demodulating the accompanying DPDCH or E-DPDCH; re-spreading demodulated soft symbols; canceling re-spread information from a chip-level input stream; and demodulating the DPDCH or E-DPDCH of a UE served by BS 604 from a chip-level input stream after canceling re-spread information.

In some embodiments, performing interference management at BS 604 comprises: demodulating and decoding, by BS 604, a DPCCH or E-DPCCH transmitted by the UE to the serving BS; determining TFCI or E-TFCI based on the demodulating and the decoding, wherein the TFCI or E-TFCI are of an accompanying DPDCH or E-DPDCH; re-encoding information symbols obtained based on the demodulating, the decoding and the determining; re-spreading information symbols; canceling re-spread information from a chip-level input stream; and demodulating and decoding the DPDCH or E-DPDCH of a UE served by BS 604 from a chip-level input stream after cancellation of re-spread information.

In various embodiments, fast time scale information can be utilized by the BS 604 in addition to slow time scale information. Embodiments utilizing fast time scale information are discussed below.

For UMTS systems, in some embodiments, the BS 604 can determine fast time scale information including, but not limited to, the UL scrambling code, and information pertaining to data transmission, such as TFCI-E-TFCI, by decoding the control channels (DPCCH/E-DPCCH) that accompany the data transmission. The semi-static information on the number of DPDCHs (which can be conveyed by the slow time scale coordination information signaling previously discussed herein, the TFS being used and the like).

For LTE systems, in some embodiments, the BS 604 can determine semi-static fast time scale information including, but not limited to, C-RNTI, physical uplink control channel (PUCCH) resource assigned, PUCCH reporting formats, and/or the UE category. The semi-static information can be conveyed over the backhaul using the coordination information signaling methods previously discussed herein. The BS 604 can also determine dynamic fast time scale information including, but not limited to, RBs assigned, MCS, and/or hopping information.

Unlike in UMTS, in LTE systems, in some embodiments, the dynamic information is not transmitted on the UL concurrently with the data. Accordingly, in some embodiments, the dynamic fast time scale information can be transmitted by the BS 602 to the UE 606 using the assignment channels (e.g., PDCCH). The cyclic redundancy check (CRC) on the assignment channel can be covered by the C-RNTI. The BS 604 can listen to the assignment channel for the BS 602 transmission to the UE 606 to determine whether the C-RNTI of the UE 606 is part of a UL assignment.

In various embodiments, BS 604 can be configured to be able to perform network listening and/or snooping of relevant broadcast information. Relevant broadcast information from the BS 602 to the UE 606 can include, but is not limited to, the bandwidth used by the UE 606, the number of antenna ports, PBCH information, and/or physical cell identifier (ID).

In some embodiments, the BS 604 can listen to the PDCCH and other DL channels transmitted from the BS 602 using symbol gating methods for performing reliable listening. Symbol gating can be employed in situations where the carrier frequencies used by BS 604 and BS 602 are the same or close to one another. The gating approach can allow BS 604 to perform network listening without being interfered by the signal transmitted by BS 604 (i.e., self-interference). In some embodiments, even when the carrier frequencies are sufficiently far apart to avoid self-interference, or maintain self-interference at an acceptable level, a gating-based approach can be desirable as it can, in some embodiments, avoid the need for an extra receive chain in BS 604.

Approaches to gating, for BS 602 and BS 604 configured to operate according to normal and extended CP, and synchronization techniques for facilitating the same, will be described below.

Figure 7:
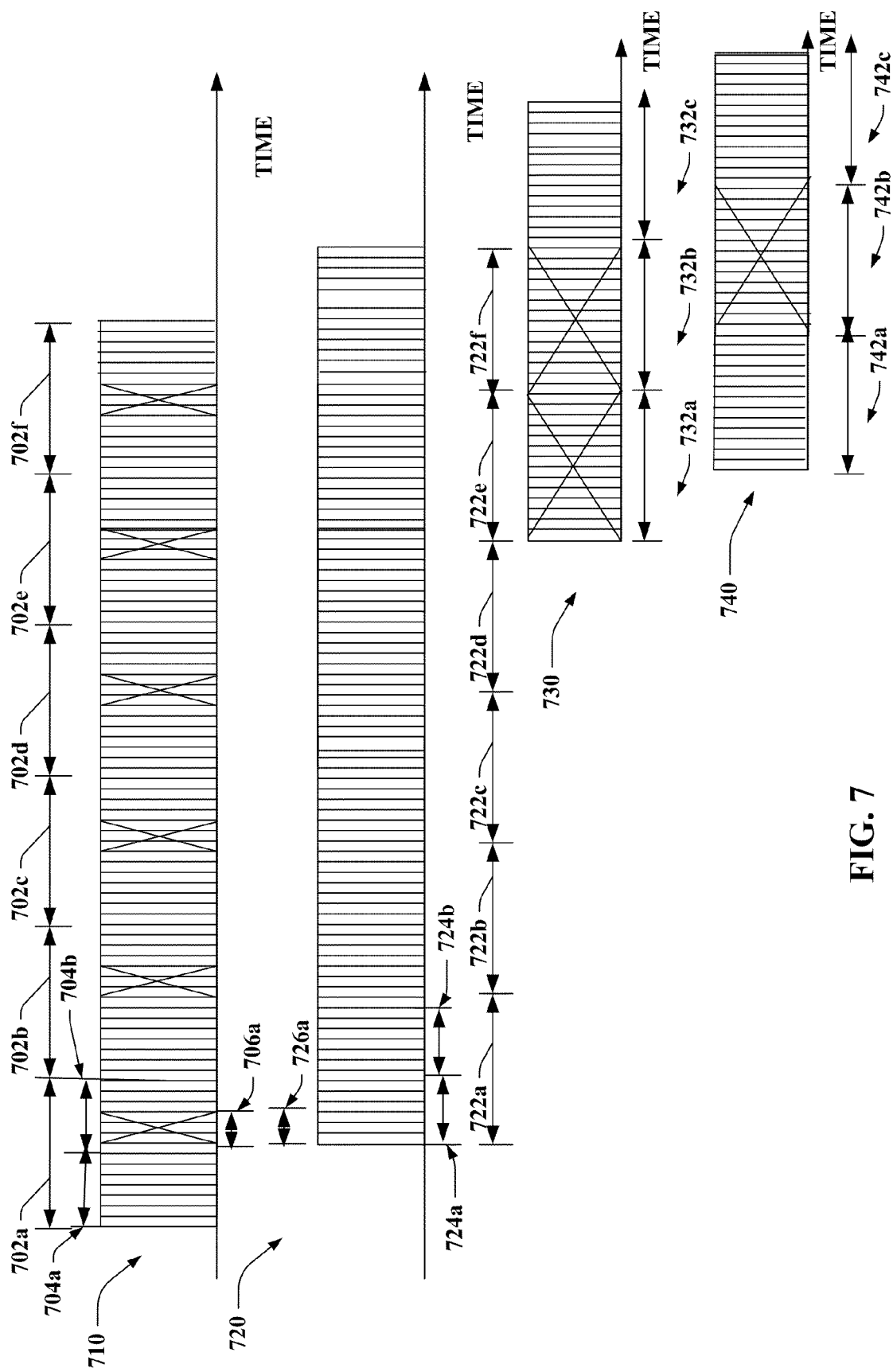
FIG. 7 illustrates example downlink and uplink timelines for facilitating interference management in accordance with various aspects set forth herein.

FIG. 7 illustrates example downlink and UL timelines for facilitating synchronization and gating in accordance with various aspects set forth herein. The timelines can be described with reference to FIGS. 6A and 7.

FIG. 7 illustrates DL timelines 710, 720 for BS 604 and BS 602, respectively. FIG. 7 also illustrates UL timelines 730, 740 for BS 602 and BS 604, respectively. FIG. 7 can represent the case when both BSs 602, 604 are using normal CP.

Referring first to the DL timelines 710, 720, DL timeline 710, can be associated with BS 604, and can include transmission within one or more subframes 702a, 702b, 702c, 702d, 702e, 702f. Each subframe 702a, 702b, 702c, 702d, 702e, 702f can include a first slot 704a, and a second time slot 704b. The BS 604 can perform symbol gating over selected symbols transmitted on the DL. As shown in FIG. 7, the symbol gating operation can be performed over regions of time in timeline 710 that correspond to the "X" indicia. For example, symbol gating can be performed during time period 706a.

The BS 602 can perform DL transmission on timeline 720. The transmission can be over one or more subframes 722a, 722b, 722c, 722d, 722e, 722f. Each subframe 722a, 722b, 722c, 722d, 722e, 722f can include a first slot 724a, and a second slot 724b. The symbol gating performed by BS 604 can be during the time period 726a during which selected symbols are transmitted on the DL from BS 602. For example, the symbol gating performed by BS 604 can be during the time period 726a during which PDCCH symbols are transmitted on the DL from BS 602 to UE 606.

In various embodiments, the subframes 702a, 702b, 702c, 702d, 702e, 702f and/or the subframes 722a, 722b, 722c, 722d, 722e, 722f can be subframes for Femto BSs and/or macro BSs, corresponding to the type of the BS 602 and BS 604. In various embodiments, the subframes 702a, 702b, 702c, 702d, 702e, 702f and/or the subframes 722a, 722b, 722c, 722d, 722e, 722f can include one or more data symbols, in addition to one or more control channel symbols.

Referring now to the UL timelines 730, 740, over UL timeline 730, BS 602 can receive information from the UE 606 over the UL. Over UL timeline 740, BS 604 can listen to the UL transmission transmitted from the UE 606 to the BS 604.

By way of example, but not limitation, subframes 722a, 722b, 722c, 722d, 722e, 722f can be considered subframes n, n+1, n+2, n+3, n+4, n+5, respectively. Also, by way of example, but not limitation, subframes 702a, 702b, 702c, 702d can be considered subframes k, k+1, k+2, k+3, respectively. Subframes 742a, 742b, 742c can correspond to subframes k+4, k+5, k+7, respectively. Subframe k+5 can see interference from the UL n+4 and n+5 (722e, 722f) transmission time periods. During subframes n and n+1, the BS 604 can transmit UL assignment information to the UE 606. The UL assignment information can be for subframes n+4 and n+5, respectively, which can be transmitted at time periods 722e and 722f, respectively.

In general, the BS 604 can align symbols transmitted on DL timeline 710 from the BS 604 with symbols transmitted DL timeline 720 from the BS 602 such that the PDCCH symbols from the BS 602 do not overlap with the symbols containing the RS for the BS 604. In particular, the BS 604 can align symbols in transmitted from the BS 604 during time period 706a in the second slot 704b with PDCCH symbols transmitted from BS 602 during the first slot 724a of subframe 722a, in time period 726a. In one embodiment, symbols two, three or four in the second slot 704b can be aligned with the first two or the first three symbols in the first slot 724a. In some embodiments, the BS 604 and/or the BS 602 can be a macro BS.

Accordingly, the three symbols at time period 706a transmitted from the BS 604 are gated off. The BS 604 can lower the DL transmit power during the symbols at time period 706a. In some embodiments, the BS 604 turns off transmission during the symbols at time period 706a. The BS 604 then receives the information transmitted from the BS 602 to the UE 606 and performs interference management.

Figure 8A:
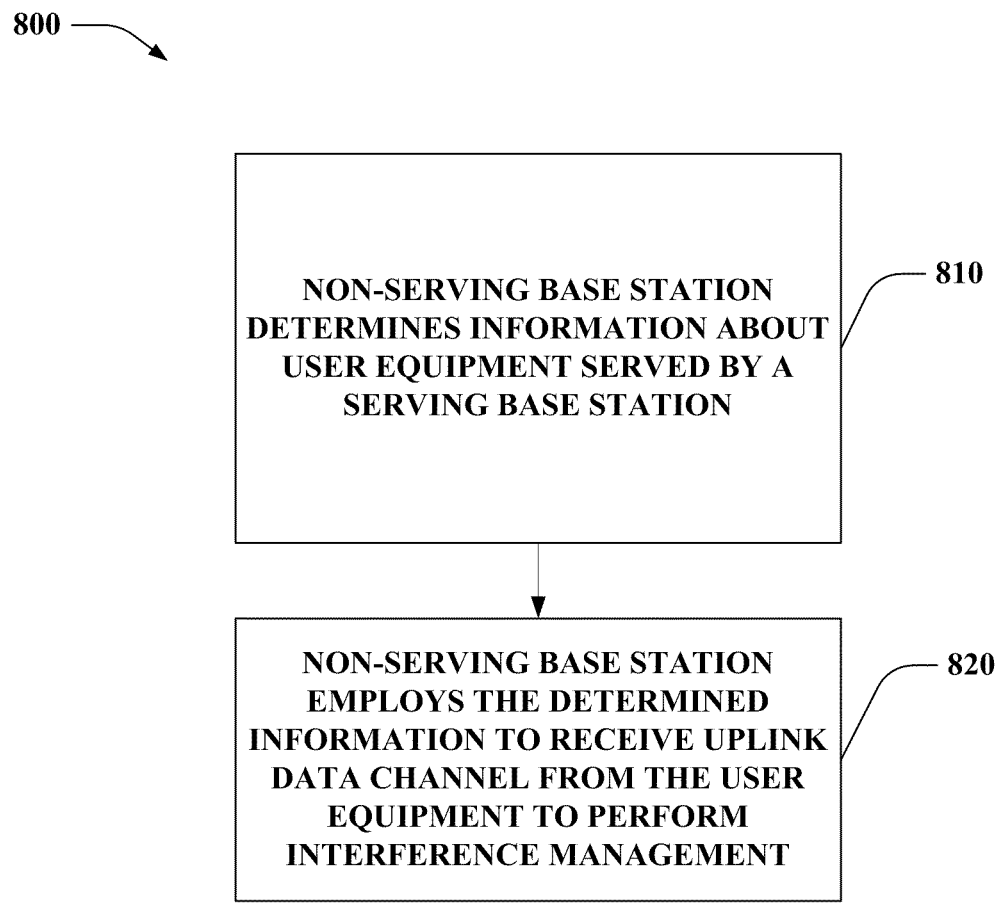
FIGS. 8A and 8B are illustrations of flowcharts of methods for facilitating interference management in accordance with various aspects set forth herein.

Methods employing the timelines described above are as follows. FIG. 8A is a flow chart of another example method for facilitating for interference management in accordance with various aspects set forth herein. The method 800 can be employed in UMTS.

At 810, method 800 can include determining, by a non-serving BS, information about a UE. At 820, method 800 can include employing, by the non-serving BS, determined information about the UE to receive an UL data channel from the UE and perform interference management.

In some embodiments, for example, in UMTS, the information can include a first portion and a second portion. The first portion can be determined based, at least, in part, on coordination information signaling received from the serving BS. The second portion can be determined by decoding control channel information transmitted by the UE. In some embodiments, the first portion includes semi-static information. The semi-static information can include: at least an uplink scrambling code for use by the UE and one of a number of uplink slot configurations being used by the UE. The control channel information transmitted by the UE can include DPCCH information or E-DPCCH information. In some embodiments, the second portion can include an UL TFCI or E-TFCI. The UL TFCI or E-TFCI can be transmitted from the UE on an UL concurrently with data.

In some embodiments, for example, in LTE, a first portion of the information can be semi-static information. The semi-static information can be determined based, at least, in part, on coordination information signaling received from the serving BS. The semi-static information can include a cell radio network temporary identifier for the UE, a PUCCH resource assigned to the UE, a category of the UE and/or a PUCCH format. In some embodiments, a second portion of the information can be dynamic information. In some embodiments, the dynamic information can include one or more resource blocks assigned to the UE, hopping information for the UE and/or modulation and coding scheme information. In some embodiments, the dynamic information can include one or more RBs assigned to the UE, hopping information for the UE and/or MCS information can be transmitted on the PUCCH accompanying the PUSCH.

In these embodiments, decoding the PDCCH can be performed after synchronizing a BS 604 downlink subframe with a BS 602 downlink subframe. In some embodiments, synchronizing, and subsequent gating, is performed based, at least, on: an interference level determined, whether the downlink transmission from the non-serving BS is a first transmission or a re-transmission and/or an extent of additional reliability to be conveyed during a downlink re-transmission by the non-serving BS.

In some embodiments, synchronizing includes staggering the BS 604 downlink subframe with the BS 604 downlink subframe. The staggering can be such that a plurality of data symbols in the BS 604 downlink subframe is aligned with a plurality of control channel symbols in the BS 602 downlink subframe.

The non-serving BS can then reduce or turn off the power of its transmitter and listen to the downlink from the serving BS to determine UL assignment information for the UE served by the serving BS. For example, the non-serving BS can determine: whether the UE is scheduled for UL transmission, and whether the cell radio network temporary identifier is included in an UL grant transmitted on the physical downlink control channel to the UE to determine whether the UE is scheduled to transmit on an uplink, wherein the determining is based, at least, in part, on decoding a decoded physical downlink control channel.

In some embodiments, one or more of symbols in the subframe includes data symbols. In some embodiments, gating is performed during transmission of the PDCCH from BS 602. The BS 604 can receive the PDCCH transmission being transmitted by the BS 602 to the UE 606. In various embodiments, the BS 604 can receive the PDCCH transmission upon decoding the DL transmission from the BS 602 to the UE 606.

The BS 604 can search for the C-RNTI for the UE 606 to which the PDCCH transmission was being transmitted by the BS 602. The BS 604 can employ the decoded PDCCH in order to search for the C-RNTI.

The BS 604 can decode pertinent information about a UL assignment for the UE 606 based on the detected UL assignment. In some embodiments, the BS 604 can detect the UL assignment for the UE 606 when the BS 604 listens for, and decodes, the PDCCH transmission.

As shown in UL timelines 730, 740, the BS 604 can listen to the UL transmission from the UE 606 to the BS 602. In some embodiments, listening can be performed through snooping the UL assignment information. Snooping a transmission to a UE can include trying to decode the assignments corresponding to the C-RNTI of the UE.

The BS 604 can use the information detected from the UL assignment for interference management. Interference management can include, but is not limited to, interference avoidance, interference cancellation or other reception techniques. The interference management can be performed by the BS 604 on interference resultant from the UE 606 served by the BS 602.

When UL assignment information is received, the fast time scale information module 618 of BS 604 can evaluate the information to determine additional parameters related to communication between the UE 606 and BS 602. For example, the fast time scale information module 618 can determine RBs assigned, modulation and coding scheme (MCS), hopping information, and/or the like based on information determined over the PDCCH. In UMTS systems, for example, the fast time scale information module 618 can synchronize with the UE 606 to determine DPCCH information as an alternative/additional way to receive parameters. In this example, the fast time scale information module 618 can demodulate and decode the information (e.g., to determine a transport format combination indicator (TFCI)), demodulate data symbols on DPDCH (e.g., using TFCI), and cancel interference based on the DPDCH information. In yet another example, for LTE systems, fast time scale information module 618 can synchronize with the UE 606 to determine DL control channel information as an alternative/additional way to receive parameters. In this example, the fast time scale information module 618 can demodulate and decode the DL control channel information, demodulate data symbols transmitted on the UL (by using the demodulated and decoded control channel information), and cancel interference based on the information obtained by demodulating the data symbols transmitted on the UL.

In some system embodiments, the fast time scale information can be dynamic information that can be exchanged between BSs 602, 604 over the backhaul of the system. For example, the fast time scale information can be exchanged over an optical fiber backhaul or a local area network with multiple BSs in an office. Further, in some embodiments, a method for determining fast time scale information autonomously at the BS 604 can be employed in lieu of the fast time scale information being exchanged over the backhaul. The BS 604 can then have information for canceling and/or avoiding interference from the UE 606.

Figure 8B:
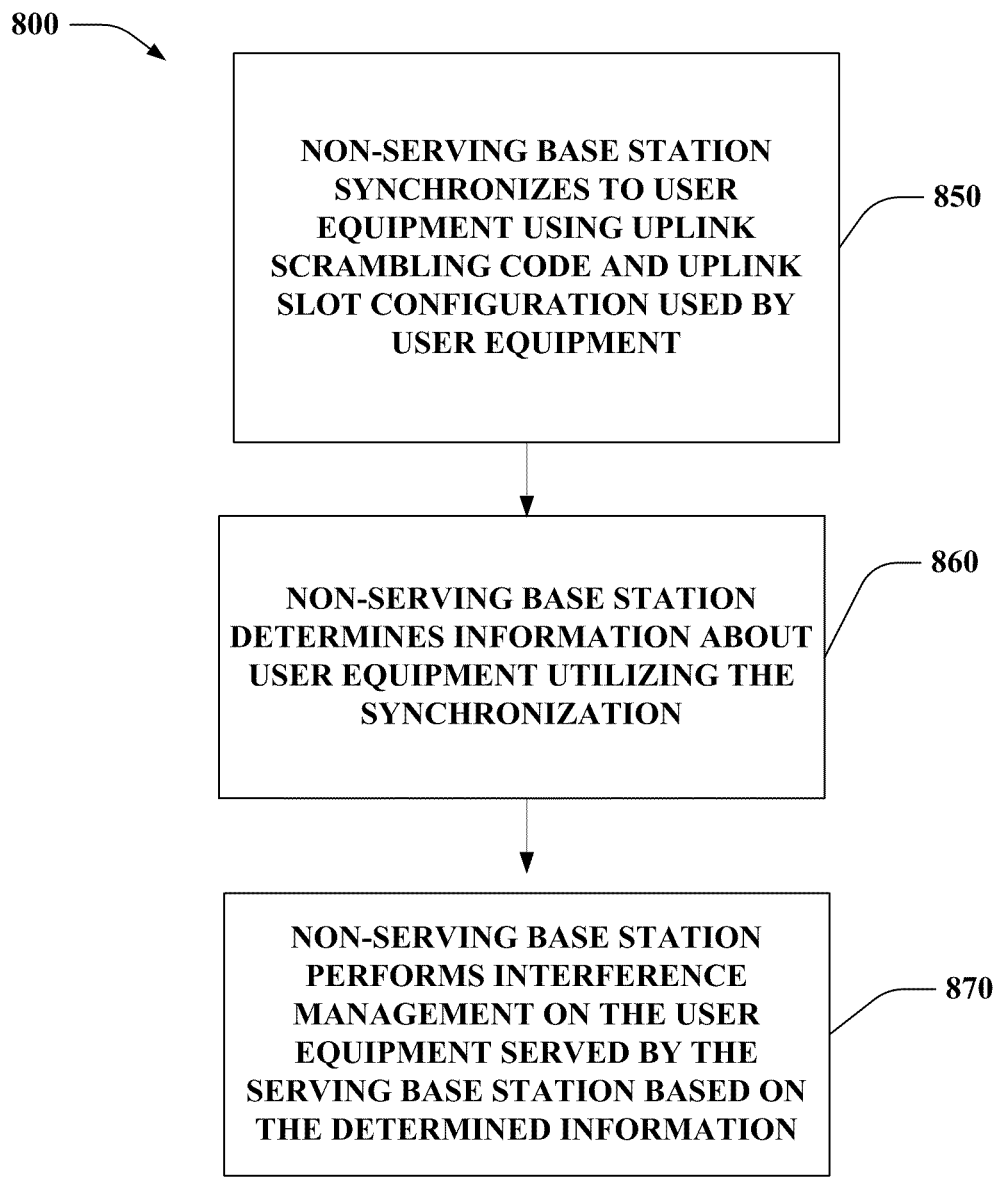

FIG. 8B is another method for facilitating interference management in a wireless communication system. At 850, method 840 can include synchronizing the non-serving BS to the UE using information indicative of the uplink scrambling code for use by the UE and information indicative of uplink slot configurations being used by the UE.

The synchronizing can include: processing one or more pilot symbols of the dedicated physical control channel information or enhanced dedicated physical control channel information, and performing channel estimation.

At 860, method 840 can include determining information about a UE, wherein the UE is served by a serving BS.

In some embodiments, the information comprises a first portion and a second portion, wherein the first portion is determined based, at least, in part, on coordination information signaling obtained from the serving BS, and wherein the second portion is determined by decoding control channel information transmitted by the UE.

The first portion can include semi-static information including at least an uplink scrambling code for use by the UE and one of a number of uplink slot configurations being used by the UE, and wherein the control channel information transmitted by the UE comprises a dedicated physical control channel information or enhanced dedicated physical control channel information.

In some embodiments, the information comprises a first portion and a second portion, wherein the first portion is determined based, at least, in part, on coordination information signaling obtained from the serving BS, and wherein the second portion is determined by decoding control channel information transmitted by the UE.

In some embodiments, the second portion comprises a transport format combination indicator or enhanced transport format combination indicator, wherein the transport format combination indicator or enhanced transport format combination indicator is transmitted concurrently with data on an uplink from the UE.

At 870, method 840 can include employing determined information about the UE to perform interference management at a non-serving BS.

In some embodiments, performing interference management at the non-serving BS comprises at least one of: employing uplink assignment information to cancel an uplink signal transmitted from the UE or scheduling transmission of a signal on a carrier different than a carrier on which an uplink signal from the UE is scheduled for transmission.

In some embodiments, performing interference management at the non-serving BS comprises: demodulating and decoding, by the non-serving BS, the dedicated physical control channel information or enhanced dedicated physical control channel information to determine at least one of: the transport format combination indicator or enhanced transport format combination indicator of an accompanying dedicated physical data channel or accompanying enhanced dedicated physical data channel.

In some embodiments, performing interference management at the non-serving BS comprises: demodulating and decoding, by the non-serving BS, the dedicated physical control channel information or enhanced dedicated physical control channel information transmitted by the UE, wherein the demodulating and decoding is performed to determine the transport format combination indicator or enhanced transport format combination indicator of an accompanying dedicated physical data channel or enhanced dedicated physical data channel; demodulating the accompanying dedicated physical data channel or enhanced dedicated physical data channel; re-spreading demodulated soft symbols; canceling re-spread information from a chip-level input stream; and demodulating a dedicated physical data channel or enhanced dedicated physical data channel of a UE served by the non-serving BS after the canceling re-spread information from a chip-level input stream. In some embodiments, performing interference management at the non-serving BS further comprises quantizing demodulated data symbols on the dedicated physical data channel or enhanced dedicated physical data channel prior to re-spreading and canceling.

In some embodiments, performing interference management at the non-serving BS comprises: demodulating and decoding, by the non-serving BS, the dedicated physical control channel information or enhanced dedicated physical control channel information transmitted by the UE to the serving BS; determining the transport format combination indicator or enhanced transport format combination indicator based on the demodulating and decoding, wherein the transport format combination indicator or enhanced transport format combination indicator is an indicator of an accompanying dedicated physical data channel or enhanced dedicated physical data channel of the UE; demodulating and decoding the accompanying dedicated physical data channel or enhanced dedicated physical data channel of the UE; re-encoding information symbols obtained based on the demodulating and decoding and based on the determining; re-spreading information symbols; canceling re-spread information from a chip-level input stream; and demodulating and decoding the dedicated physical data channel or enhanced dedicated physical data channel of a UE served by the non-serving BS after the canceling re-spread information from a chip-level input stream.

Figure 9:
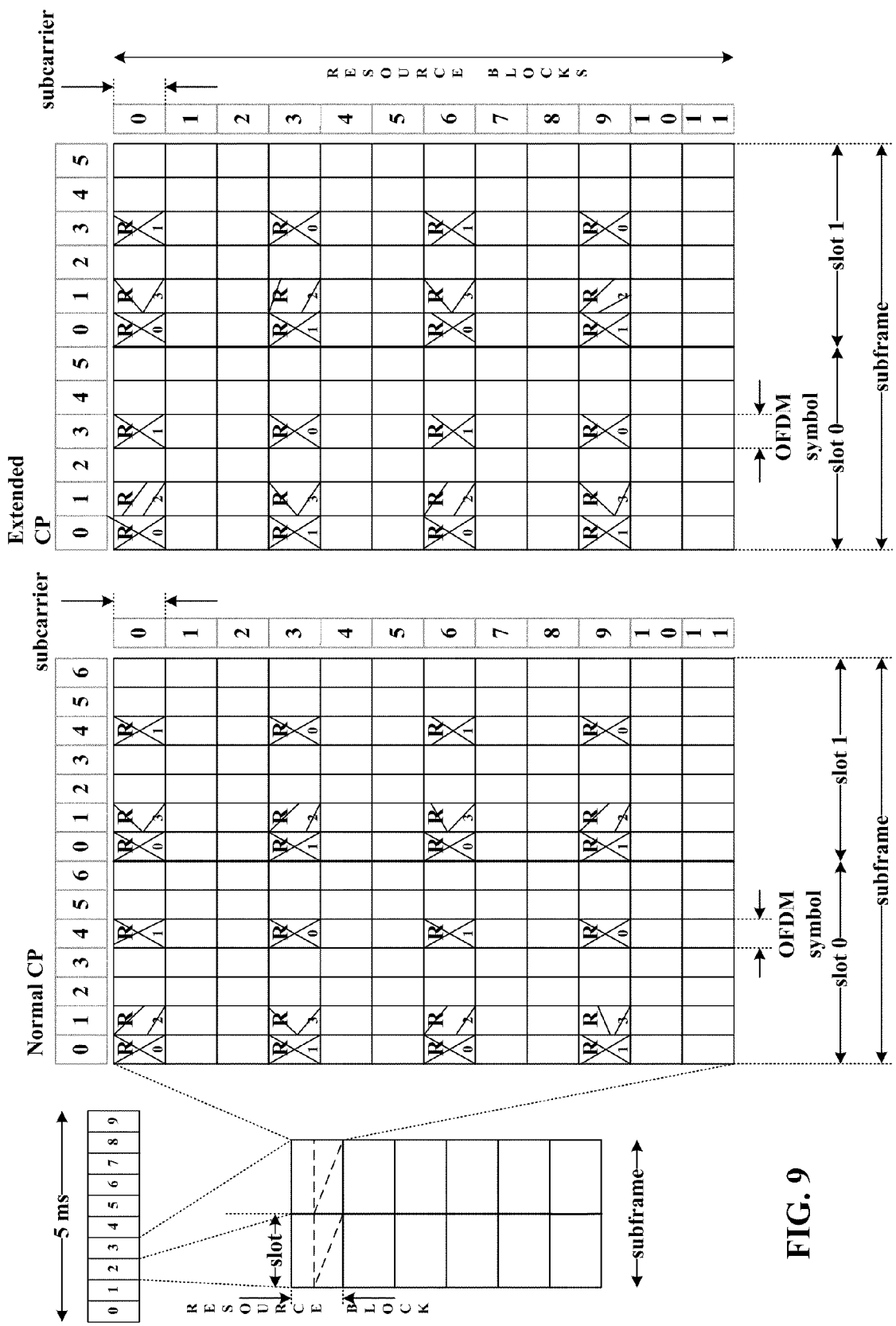
FIG. 9 is a block diagram of example subframe structures for normal and extended cyclic prefix for facilitating interference management in accordance with various aspects set forth herein.

Numerous approaches to gating can be taken based on the type of cyclic prefix for which the BS 602 and BS 604 are configured. FIG. 9 is a block diagram of example subframe structures for normal and extended CP for facilitating interference management in accordance with various aspects set forth herein. FIG. 9 illustrates an embodiment utilizing the 2-transmit antenna case for the BS 604, so only the resource elements (REs) labels R0 or R1 are valid. The REs R0 and R1 can be indicated by the blocks in which the "X" indicator is provided in FIG. 9. As shown in FIG. 9, for normal CP, OFDM symbols 0, 1, 2, 3, 4, 5, and 6 are provided in single slot, while for extended CP, OFDM symbols 0, 1, 2, 3, 4 and 5 are provided in a single slot.

Figure 10:
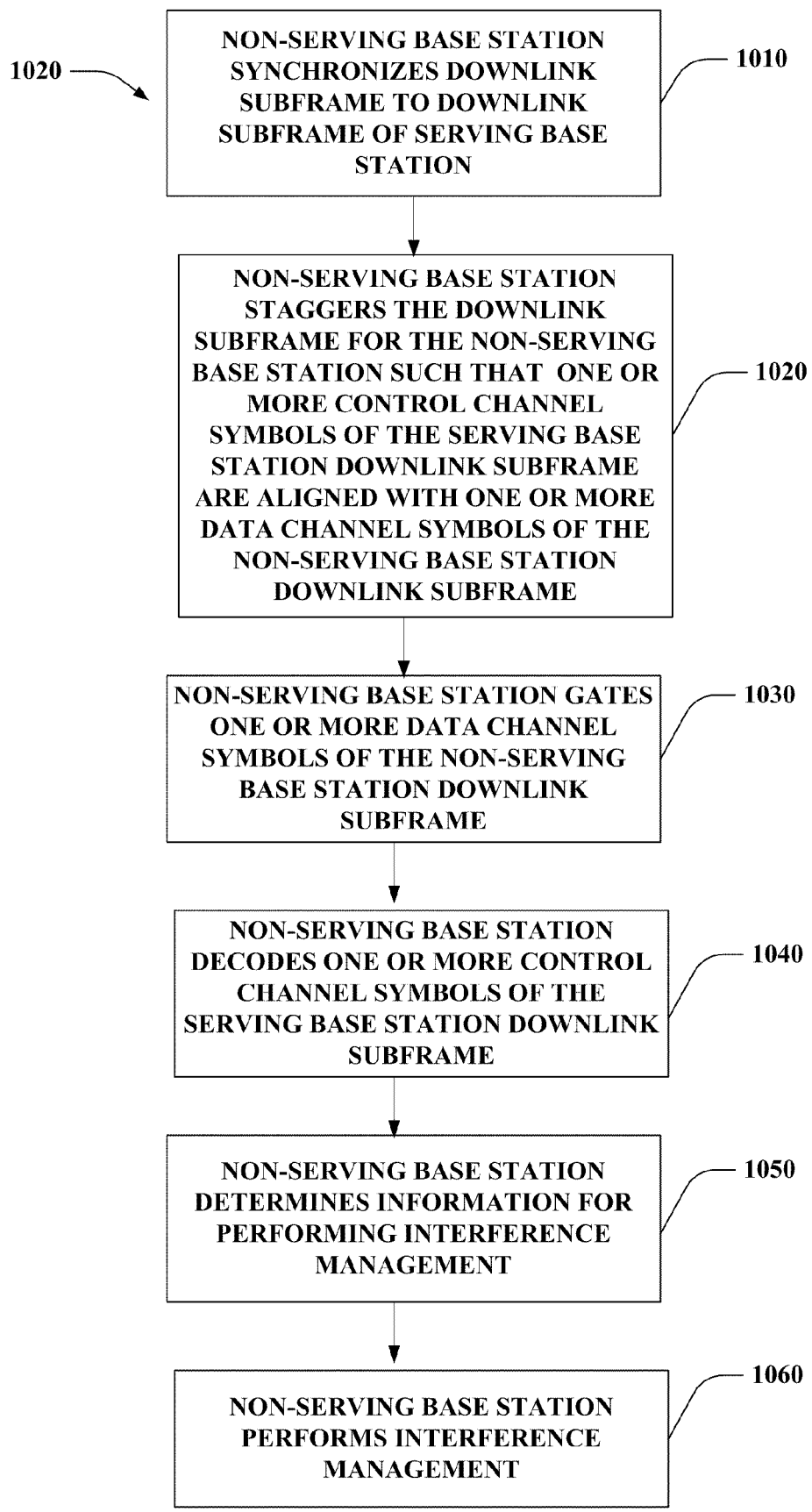
FIGS. 10, 11 and 12 are illustrations of flowcharts of methods for facilitating interference management in accordance with various aspects set forth herein.

Detailed features of an exemplary method including synchronization, staggering of subframes and gating are as follows. FIG. 10 will be described with reference to FIG. 7. At 1010, method 1000 can include BS 604 synchronizing a downlink subframe from BS 604 to a downlink subframe from BS 602.

At 1020, method 1000 can also include staggering the downlink subframe with the downlink subframe such that at least one of the one or more symbols of the BS 602 downlink subframe is aligned with at least one of the one or more symbols of the downlink subframe.

At 1030, method 1000 can include gating one or more symbols of the downlink subframe. In some embodiments, gating one or more symbols comprises reducing or ceasing a power associated with transmitting the symbols of the BS 604 downlink subframe.

In various embodiments, gating can be performed according to the type of the cyclic prefix for BS 604 and BS 602. In some embodiments, BS 604 and BS 602 are configured for normal cyclic prefix operation. In some of these embodiments, the one or more symbols of the downlink subframe comprises three PDCCH symbols, and the one or more symbols of the downlink subframe comprises symbols two, three and/or four of a second slot of the downlink subframe.

In some embodiments, the BS 604 and the BS 602 are configured for normal cyclic prefix operation. In some of these embodiments, the one or more symbols of the downlink subframe comprises three PDCCH symbols, and the one or more symbols of the downlink subframe comprises symbols two, three and/or four of a second slot of the BS 604 downlink subframe. In some of these embodiments, the method 1090 can also include searching, during the symbols two, three and/or four of a second slot of the downlink subframe, for the C-RNTI for the UE 606, and determining UL assignment information for the UE served by the serving BS.

In some of these embodiments for normal cyclic prefix operation, specific interference management can be performed. The interference management can include at least one of: selecting a transport format or one or more RBs to assign on an UL to UE 606 served by the serving BS 602 or selecting an UL power control command for the UE 606 served by the serving BS 602.

In some embodiments, the BS 604 and the serving BS are configured for extended cyclic prefix operation. In some of these embodiments, the one or more symbols of the downlink subframe comprises three PDCCH, and the one or more symbols of the downlink subframe comprises symbols two, three and/or four of a second slot of the downlink subframe. In these embodiments, the method can also include power boosting a first symbol containing a cell-specific reference signal in the one or more symbols of the downlink subframe and not transmitting or transmitting at low power (e.g., gating) data in the one or more symbols of the downlink subframe.

In some embodiments, the BS 604 and BS 602 are configured for extended cyclic prefix operation. In some of these embodiments, the one or more symbols of the downlink subframe comprises a first one or the first two PDCCH, and wherein the one or more symbols of the downlink subframe comprises symbol two or symbols two and three of a second slot of the downlink subframe. In some of these embodiments, the method can also include decoding the first two PDCCH symbols, wherein decoding comprises using control channel elements (CCEs) decoded by the BS 604 during the symbols two and three of a second slot of the downlink subframe.

In some embodiments, the BS 604 and BS 602 are configured for extended cyclic prefix operation. In some of these embodiments, the one or more symbols of the downlink subframe comprises a first two PDCCH, and the one or more symbols of the downlink subframe comprises symbols two, three and/or four of a second slot of the downlink subframe, wherein symbol four of the second slot includes a common reference signal and not data.

In some embodiments, the BS 604 and the BS 602 are configured for extended cyclic prefix operation. In some of these embodiments, the one or more symbols of the downlink subframe comprises a first two PDCCH symbols, and the one or more symbols of the downlink subframe comprises symbols two, three and/or four of a second slot of the downlink subframe, wherein symbol four of the second slot includes a common reference signal and not data, and wherein the second slot also includes common reference signals transmitted within data RBs from the BS 604.

In some embodiments, the BS 604 is configured for normal cyclic prefix operation and the BS 602 is configured for extended cyclic prefix operation. In some of these embodiments, the one or more symbols of the downlink subframe comprises three PDCCH symbols, and the one or more symbols of the downlink subframe comprises three symbols, wherein a second symbol of the three symbols is synchronized to align with a first symbol of the three PDCCH.

In some embodiments, wherein the BS 602 is configured for normal cyclic prefix operation and the BS 604 is configured for extended cyclic prefix operation, and wherein the one or more symbols of the downlink subframe comprises PDCCH symbols, and wherein the one or more symbols of the downlink subframe are aligned such that a second symbol of a second slot of the downlink subframe is synchronized to align with a first one of the physical downlink control channel symbols.

Referring back to FIG. 10, at 1040, method 1000 can include decoding one or more symbols of the downlink subframe.

In some embodiments, the one or more symbols of the downlink subframe are one or more PDCCH symbols. Additionally, at least a first portion of the information is semi-static information and wherein a second portion of the information is dynamic information. In some embodiments, the semi-static information is included in a coordinating message and comprises a C-RNTI for the UE, a PUCCH resource assigned to the UE, a category of the UE or a PUCCH format. In some embodiments, the dynamic information comprises a set of resource blocks assigned to the UE, hopping information for the UE or MCS information.

At 1050, method 1000 can include determining information for performing interference management associated with the UE 606. In some embodiments, the information can be determined based, at least, in part, on decoding one or more symbols of the downlink subframe.

At 1060, method 1000 can also include performing interference management at the BS 604. In some of these embodiments, performing interference management comprises: demodulating and decoding, by the BS 604, PDCCH symbols of the downlink subframe; demodulating and decoding, by the BS 604, data associated with the UE 606 based, at least, on demodulating and decoding the PDCCH symbols of the downlink subframe; re-spreading demodulated soft symbols; canceling re-spread information from a chip-level input stream; and demodulating data associated with a UE served by the BS 604 after the canceling re-spread information from a chip-level input stream. In some embodiments, performing interference management can also include quantizing demodulated soft symbols to a nearest constellation prior to re-spreading and canceling.

Figure 11:
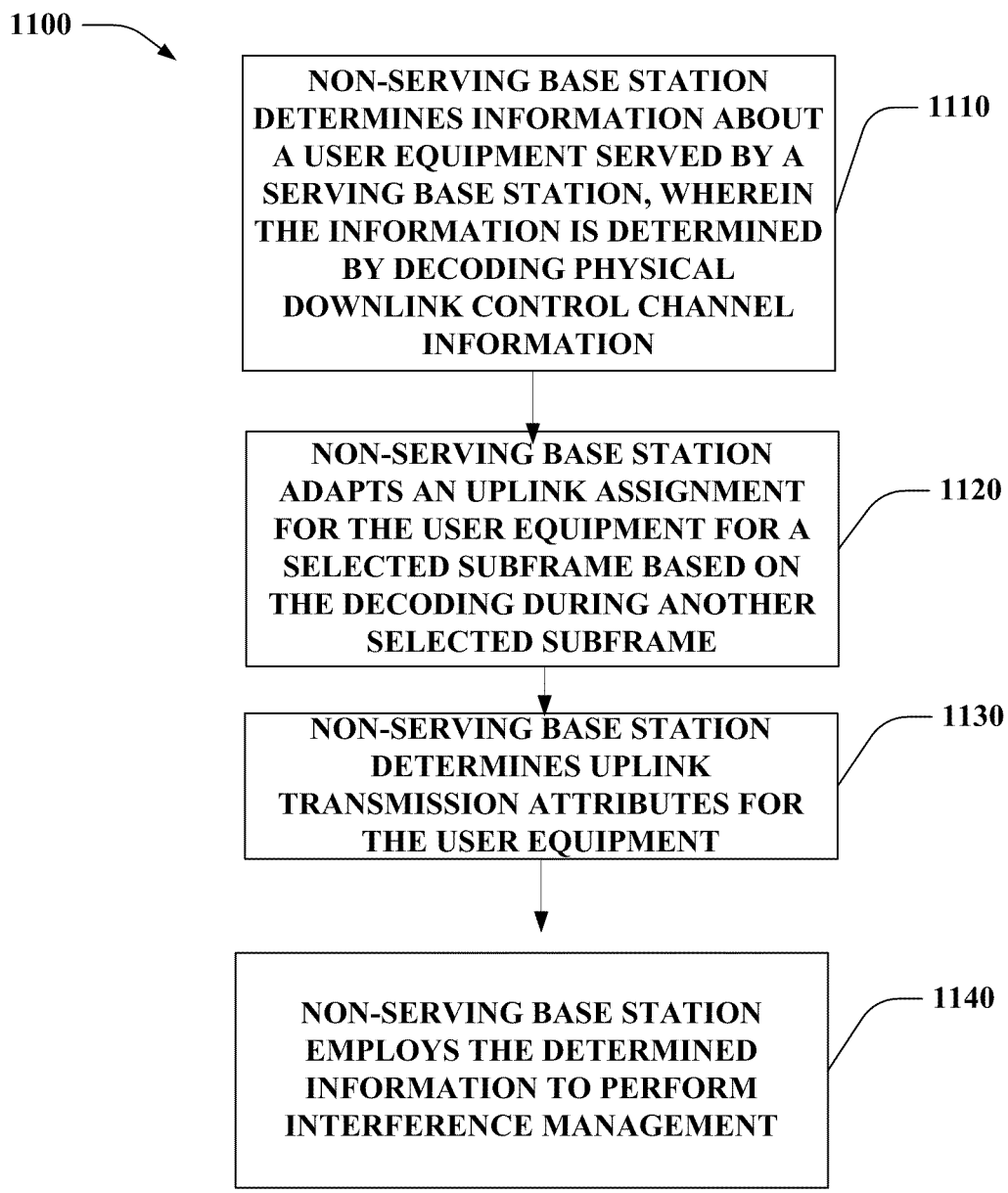

FIG. 11 is a flow chart of another example method for facilitating interference management in accordance with various aspects set forth herein.

At 1110, method 1100 can include determining, by a non-serving BS, information about a UE served by the serving BS, wherein the determining is performed by decoding PDCCH information transmitted from the serving BS to the UE on a downlink. At 1120, method 1100 can include adapting, by the non-serving BS, an UL assignment for a selected subframe of the BS 604 downlink subframe based, at least, in part, on decoding the PDCCH from the serving BS during a selected subframe of the BS 602 downlink subframe. At 1130, method 1100 can include determining UL transmission attributes for the UE served by the serving BS, wherein the determining UL transmission attributes is performed after the determining whether the UE is scheduled on the UL based on the UL assignment.

At 1140, method 1100 can include employing, by the non-serving BS, determined information about the UE to perform at least one of interference management of the UE served by the serving BS or power control based, at least, in part, on interference from the UE served by the serving BS. Performing interference management can be based, at least, in part, on the determined UL transmission attributes in response to determining that the UE served by the serving BS is scheduled on the UL. Interference management can include the interference cancellation, avoidance and other reception techniques described herein.

Figure 12:
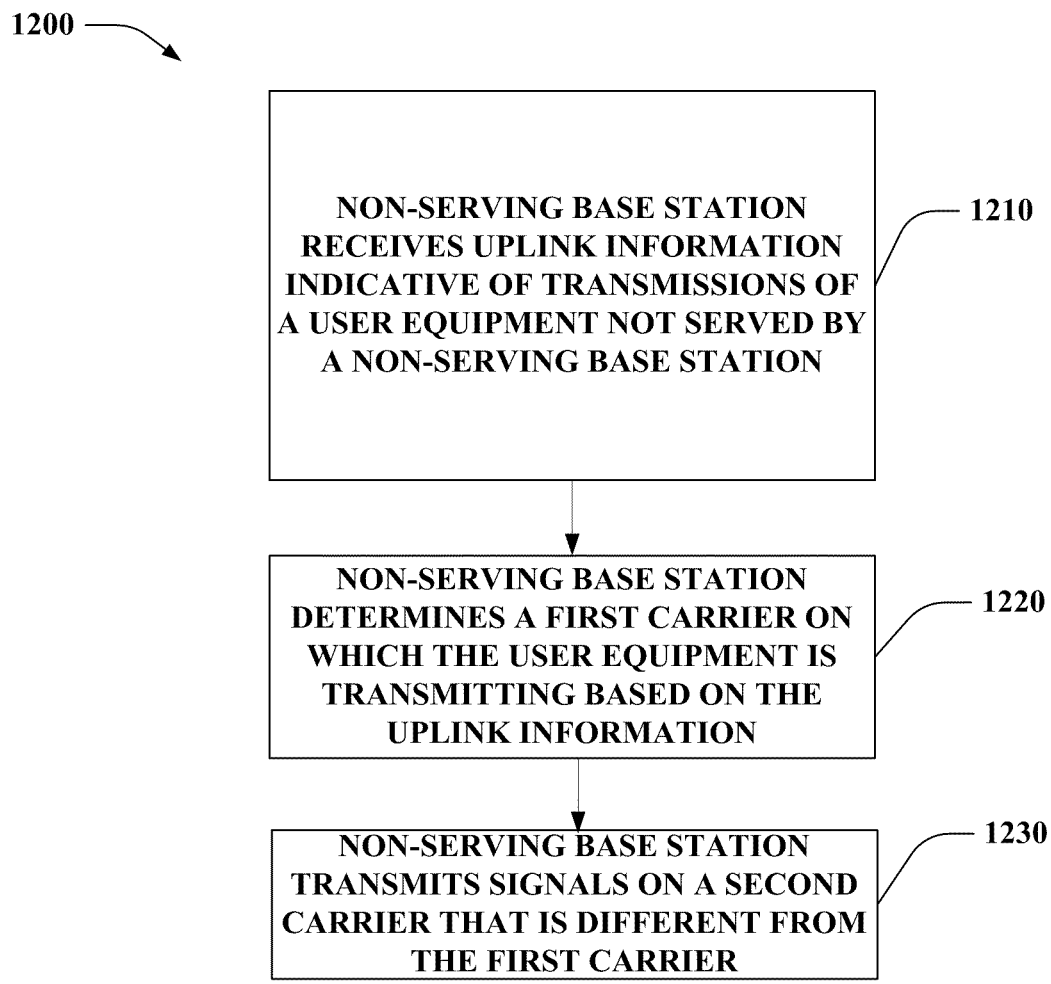

FIG. 12 is a flow chart of an example method for facilitating interference management in accordance with various aspects set forth herein.

At 1210, method 1200 can include a BS 602 receiving UL information indicative of transmissions by UE 606. At 1220, method 1200 can include the BS 604 determining, for the UE 606, a first carrier on which the UE 606 is transmitting, wherein the determining is based, at least, in part, on the UL information. At 1230, method 1200 can include transmitting signals on a second carrier in response to determining that an unacceptable level of interference is present on the first carrier, wherein the second carrier is different than the first carrier.

In addition to, or in lieu of, the methods for interference management described above, in some embodiments, in LTE systems, performing interference management comprises performing cancellation of the PUCCH and/or SRS.

Further, in some embodiments, in LTE systems, a method (not shown) for adapting the UL assignment to a UE served by a serving BS can be employed. The method can be based on a determination of whether the UE is scheduled on the UL. The determination can be made based on decoding the PDCCH transmitted from the serving BS to the UE during the periods for which non-serving BS symbols are gated off. By way of example, but not limitation, with reference to FIG. 7, the UL assignment can be made in subframe k+2 based on hearing the content of the n+1 subframe.

Additionally, in some embodiments, in LTE systems, a method (not shown) for adapting the DL transmission to a UE served by a serving BS can be employed. In some embodiments, power associated with the DL transmission can be adapted. The power can be adapted based, at least, on a determination of the DL assignment to the UE. By way of example, but not limitation, with reference to FIG. 7, the UL assignment made in subframe k+2 can be adapted based on hearing the content at the n+1 subframe.

Variously, in UMTS and/or LTS embodiments, performing interference management at the non-serving BS can include at least one of: employing the UL assignment information to cancel an UL signal transmitted from the UE, scheduling transmission of a signal on a carrier different than a carrier on which an uplink signal from the UE is scheduled for transmission. In various embodiments, interference management can include, but is not limited to, interference cancellation, interference avoidance or other reception techniques.

In other embodiments of methods for facilitating interference management, the bandwidth and/or transport format at which a UE served by the BS 604 is scheduled, can be adjusted to facilitate the gating off operation.

In one embodiment, performing interference management of the UE comprises: canceling, by the non-serving BS, a signal transmitted from the UE, wherein the canceling is performed upon employing the UL assignment information decoded by the non-serving BS.

In another embodiment, performing interference management of the UE comprises: demodulating and decoding, by the non-serving BS, the dedicated physical control channel information or the enhanced dedicated physical control channel information to determine a transport format combination indicator or an enhanced transport format combination indicator of an accompanying dedicated physical data channel or enhanced dedicated physical data channel.

In another embodiment, performing interference management of the UE served by the serving BS comprises: demodulating and decoding, by the non-serving BS, the dedicated physical control channel information or the enhanced dedicated physical control channel information transmitted by the UE to the serving BS to determine a transport format combination indicator or an enhanced transport format combination indicator of an accompanying dedicated physical data channel or enhanced dedicated physical data channel, demodulating the accompanying dedicated physical data channel or enhanced dedicated physical data channel, re-spreading demodulated soft symbols, and canceling re-spread information from a chip-level input stream, demodulating the dedicated physical data channel or enhanced dedicated physical data channel of a UE served by the non-serving BS from the chip-level input stream after cancellation of the re-spread information.

In another embodiment, performing interference management of the UE served by the serving BS comprises: demodulating, by the non-serving BS, one or more UE data symbols within the dedicated physical control channel information or the enhanced dedicated physical control channel information, wherein demodulating is based, at least, in part, on performing synchronization using one or more pilot symbols in the dedicated physical control channel information or the enhanced dedicated physical control channel information, and performing channel estimation.

In another embodiment, performing interference management of the UE served by the serving BS comprises: demodulating, by the non-serving BS, one or more UE data symbols within the dedicated physical control channel information or the enhanced dedicated physical control channel information, wherein demodulating is based, at least, in part, on performing synchronization using one or more pilot symbols in the dedicated physical control channel information or the enhanced dedicated physical control channel information, and performing channel estimation, quantizing a demodulated one or more UE data symbols to a nearest constellation point, re-spreading a quantized demodulated one or more UE data symbols, and canceling re-spread information from a chip-level input stream.

In another embodiment, performing interference management of the UE served by the serving BS comprises: demodulating and decoding, by the non-serving BS, the dedicated physical control channel information or enhanced dedicated physical control channel information transmitted by the UE to the serving BS; determining the transport format combination indicator or the enhanced transport format combination indicator based on the demodulating and the decoding, wherein the transport format combination indicator or the enhanced transport format combination indicator are of the accompanying dedicated physical data channel or enhanced dedicated physical data channel; demodulating and decoding the accompanying dedicated physical data channel or enhanced dedicated physical data channel of the UE served by the non-serving BS; re-encoding information symbols obtained based on the demodulating, the decoding and the determining; re-spreading information symbols; canceling re-spread information from a chip-level input stream; demodulating and decoding the dedicated physical data channel or enhanced dedicated physical data channel of a UE served by the non-serving BS from the chip-level input stream after cancellation of re-spread information.

FIGS. 13-18 are illustrations of block diagrams of example systems employing network listening and/or interference management in accordance with various aspects set forth herein.

Figure 13:
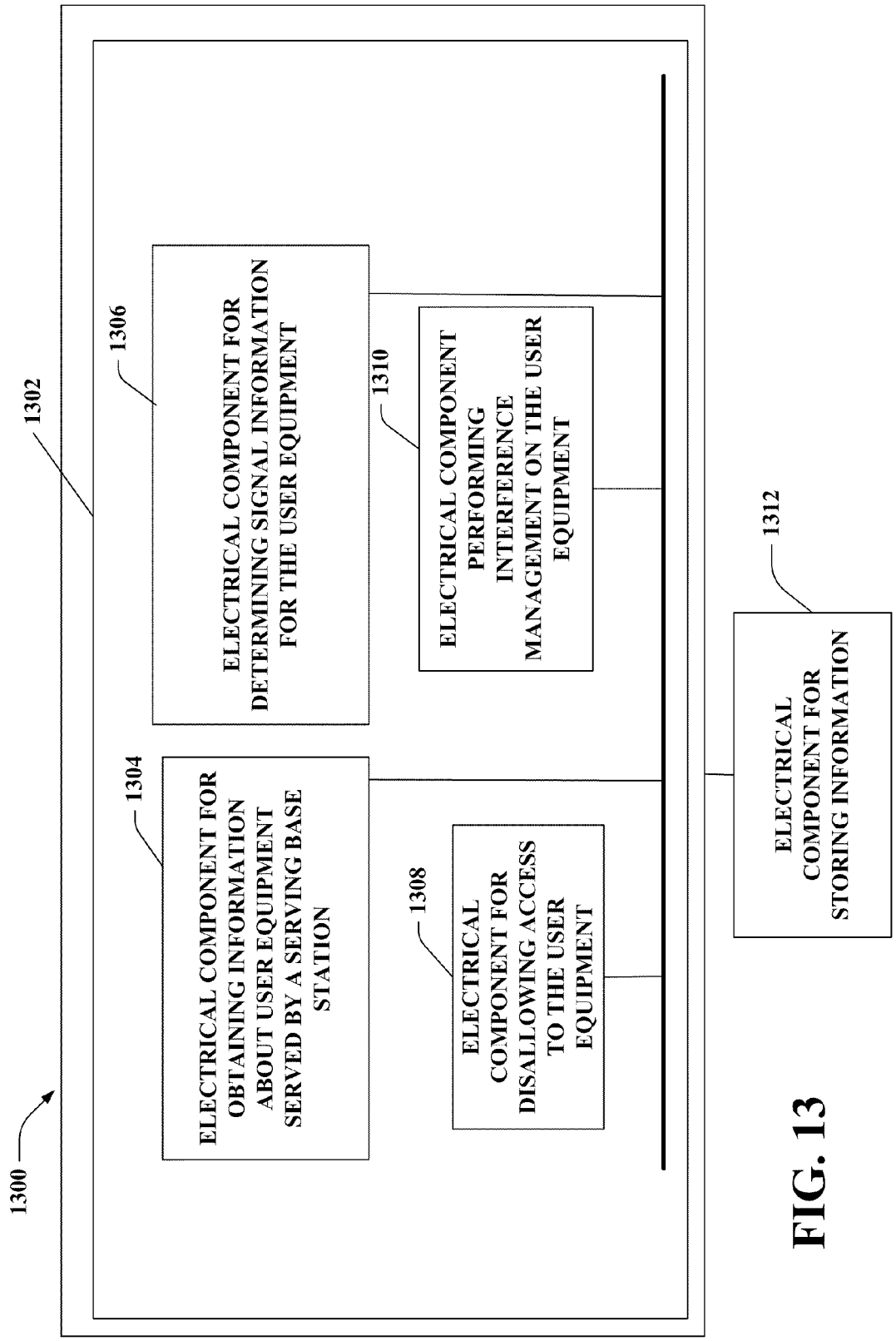
FIGS. 13-18 are illustrations of block diagrams of example systems for facilitating interference management in accordance with various aspects set forth herein.

Turning to FIG. 13, illustrated is a system for facilitating interference management. It is to be appreciated that system 1300 is represented as including functional blocks, which can be functional blocks that represent functions implemented by a processor, hardware, software, firmware, or combination thereof. System 1300 can include a logical grouping 1302 of electrical components that can act in conjunction.

For instance, logical grouping 1302 can include an electrical component 1304 for obtaining information about a UE served by a serving BS. The logical grouping 1302 can include an electrical component 1306 for determining signal information based, at least, in part, on the information.

The logical grouping 1302 can also include an electrical component 1308 for disallowing access to the UE served by the serving BS due to restricted access rules for the apparatus.

The logical grouping 1302 can also include an electrical component 1310 for performing interference management of the UE served by the serving BS In some embodiments, the information is slow time scale information. Logical grouping 1302 can also include a memory 1312 for storing information.

Figure 14:
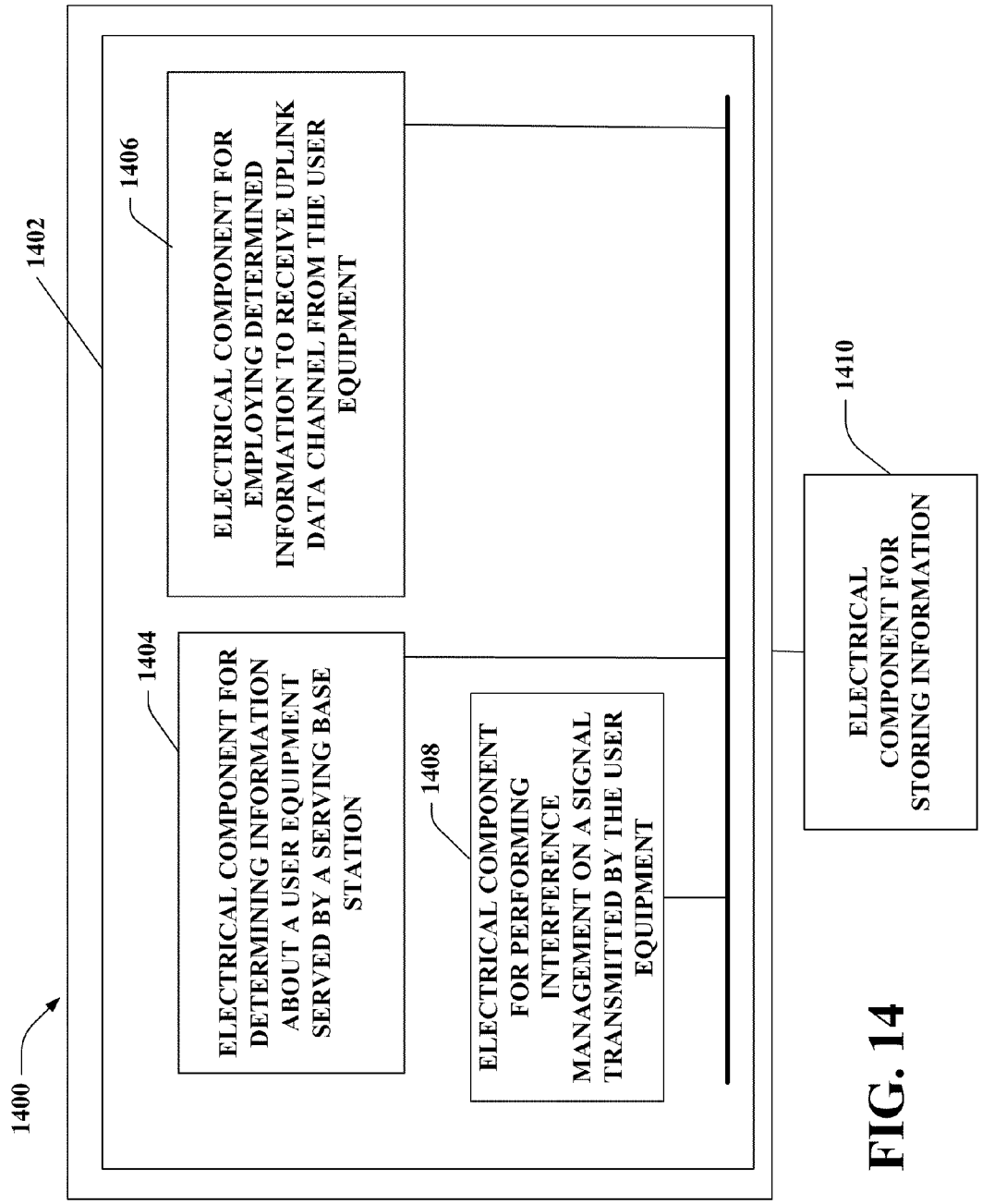

Turning to FIG. 14, illustrated is a system for facilitating interference management. It is to be appreciated that system 1400 is represented as including functional blocks, which can be functional blocks that represent functions implemented by a processor, hardware, software, firmware, or combination thereof. System 1400 can include a logical grouping 1402 of electrical components that can act in conjunction.

For instance, logical grouping 1402 can include an electrical component 1404 for determining, by a non-serving BS, information about a UE served by the serving BS.

Logical grouping 1402 can also include an electrical component 1406 for employing, by the non-serving BS, determined information about the UE to receive the UL data channel from the UE to perform interference management or power control.

Logical grouping 1404 can also include an electrical component 1408 for performing interference management on a signal transmitted by the UE served by the serving BS.

Logical grouping 1404 can also include a memory 1410 for storing information about the UE.

Figure 15:
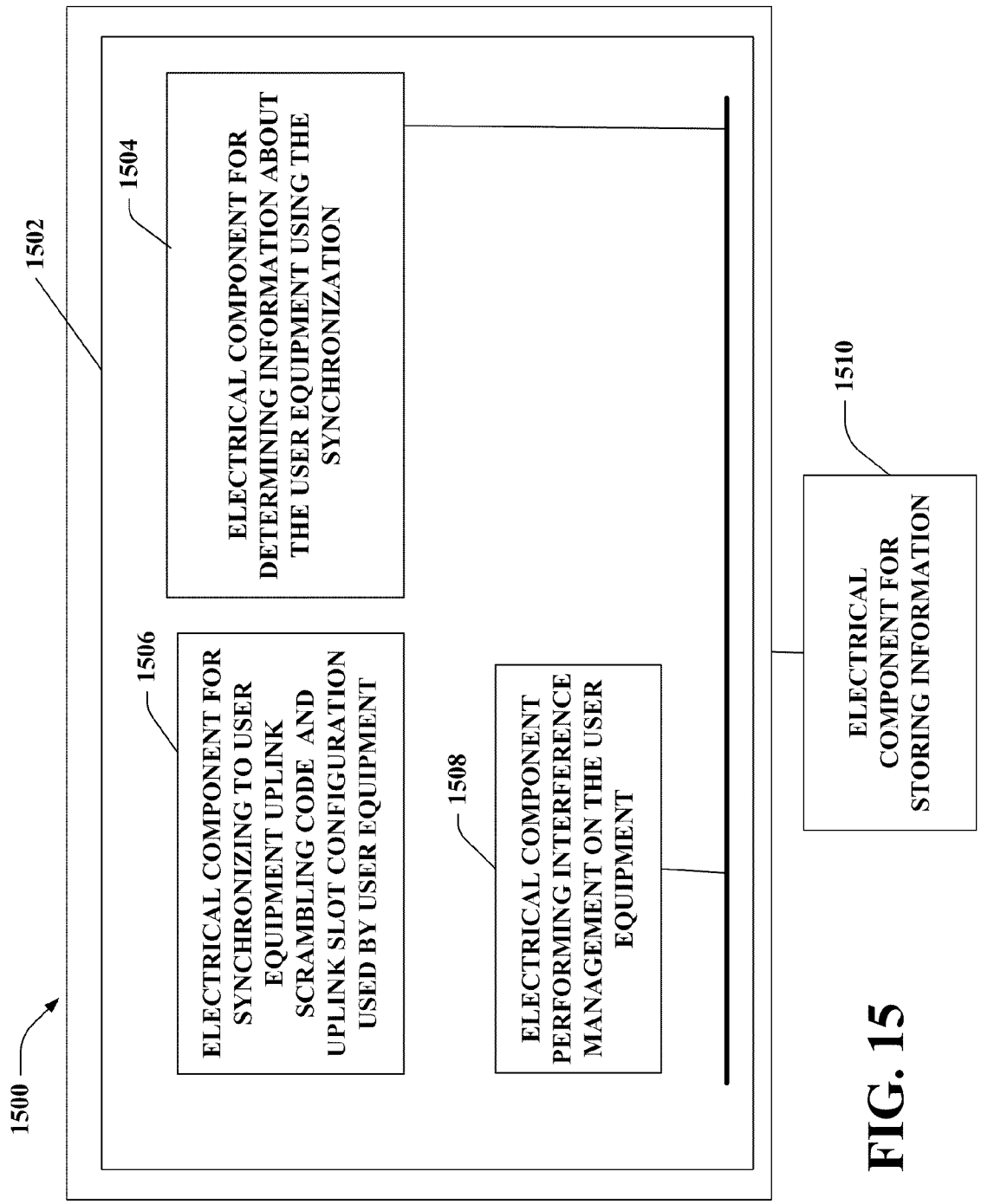

Turning now to FIG. 15, illustrated is a system for facilitating interference management. It is to be appreciated that system 1500 is represented as including functional blocks, which can be functional blocks that represent functions implemented by a processor, hardware, software, firmware, or combination thereof. System 1500 can include a logical grouping 1502 of electrical components that can act in conjunction.

For instance, logical grouping 1502 can include an electrical component 1504 for determining information about a UE, wherein the UE is served by a serving BS.

Logical grouping 1502 can also include an electrical component 1506 for synchronizing the non-serving BS to the UE using information indicative of the uplink scrambling code for use by the UE and information indicative of uplink slot configurations being used by the UE.

Logical grouping 1502 can also include an electrical component 1508 for employing determined information about the UE to perform interference management at the apparatus. Logical grouping 1504 can also include a memory 1510 for storing information about the UE.

Figure 16:
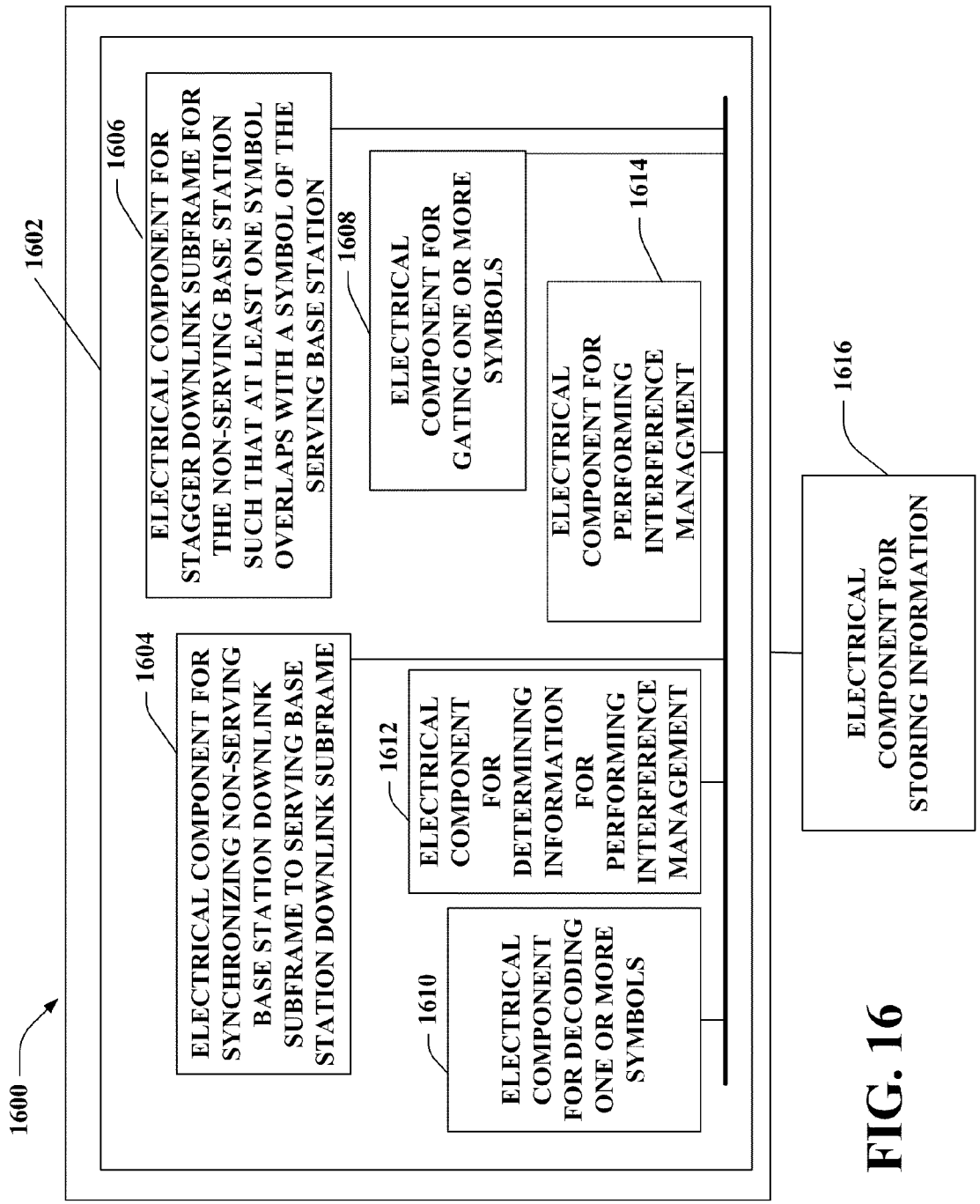

Turning now to FIG. 16, illustrated is a system for facilitating interference management. It is to be appreciated that system 1600 is represented as including functional blocks, which can be functional blocks that represent functions implemented by a processor, hardware, software, firmware, or combination thereof. System 1700 can include a logical grouping 1602 of electrical components that can act in conjunction.

For instance, logical grouping 1602 can include an electrical component 1604 for synchronizing a BS 604 downlink subframe to a BS 602 downlink subframe. Logical grouping 1602 can also include an electrical component 1606 for staggering downlink subframe for the non-serving BS such that at least one symbol overlaps with a symbol of the BS 602 downlink subframe.

Logical grouping 1602 can also include an electrical component 1608 for gating one or more symbols. Logical grouping 1602 can also include an electrical component 1610 for decoding one or more symbols.

Logical grouping 1602 can also include an electrical component 1612 for determining information for performing interference management. Logical grouping 1602 can also include an electrical component 1614 for performing interference management. Logical grouping 1602 can also include a memory 1616 for storing information.

Figure 17:
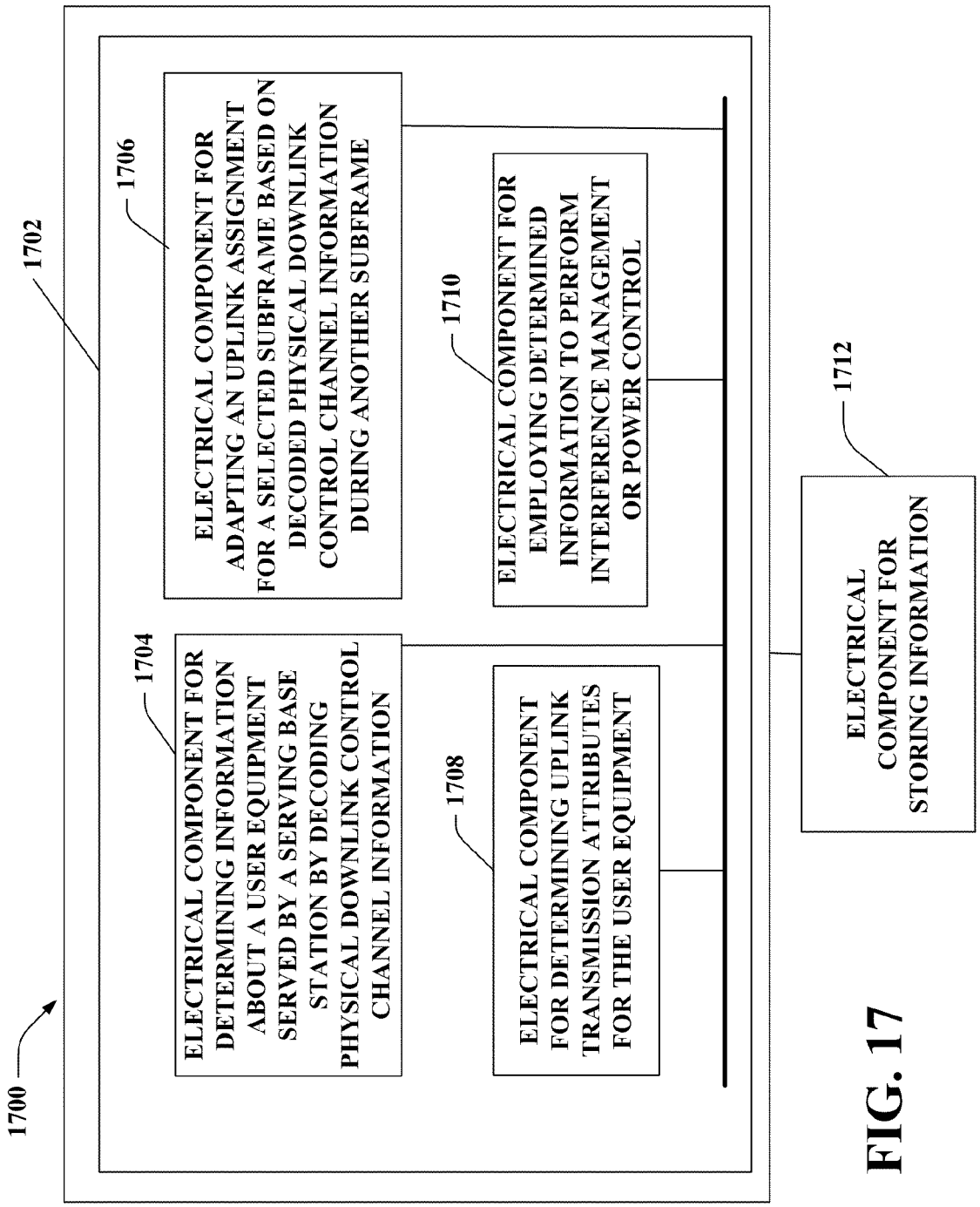

Turning now to FIG. 17, illustrated is a system for facilitating interference management. It is to be appreciated that system 1700 is represented as including functional blocks, which can be functional blocks that represent functions implemented by a processor, hardware, software, firmware, or combination thereof. System 1700 can include a logical grouping 1702 of electrical components that can act in conjunction.

For instance, logical grouping 1702 can include an electrical component 1704 for determining, by a non-serving BS, information about a UE served by the serving BS, wherein the determining is performed by decoding PDCCH information transmitted from the serving BS to the UE on a downlink.

Logical grouping 1702 can include an electrical component 1706 for adapting, by the non-serving BS, an UL assignment for a selected subframe of the BS 604 downlink subframe based, at least, in part, on decoding the PDCCH from the serving BS during a selected subframe of the BS 602 downlink subframe.

Logical grouping 1702 can include an electrical component 1708 for determining UL transmission attributes for the UE served by the serving BS, wherein the determining UL transmission attributes is performed after the determining whether the UE is scheduled on the UL based on the UL assignment.

Logical grouping 1702 can include an electrical component 1710 for employing, by the non-serving BS, determined information about the UE to perform at least one of interference management of the UE served by the serving BS or power control based, at least, in part, on interference from the UE served by the serving BS. In various embodiments, interference management can include, but is not limited to, interference cancellation, interference avoidance or other reception techniques.

Logical grouping 1702 can include a memory 1712 for storing information about the UE, UL transmission attributes and UL assignment information.

Figure 18:
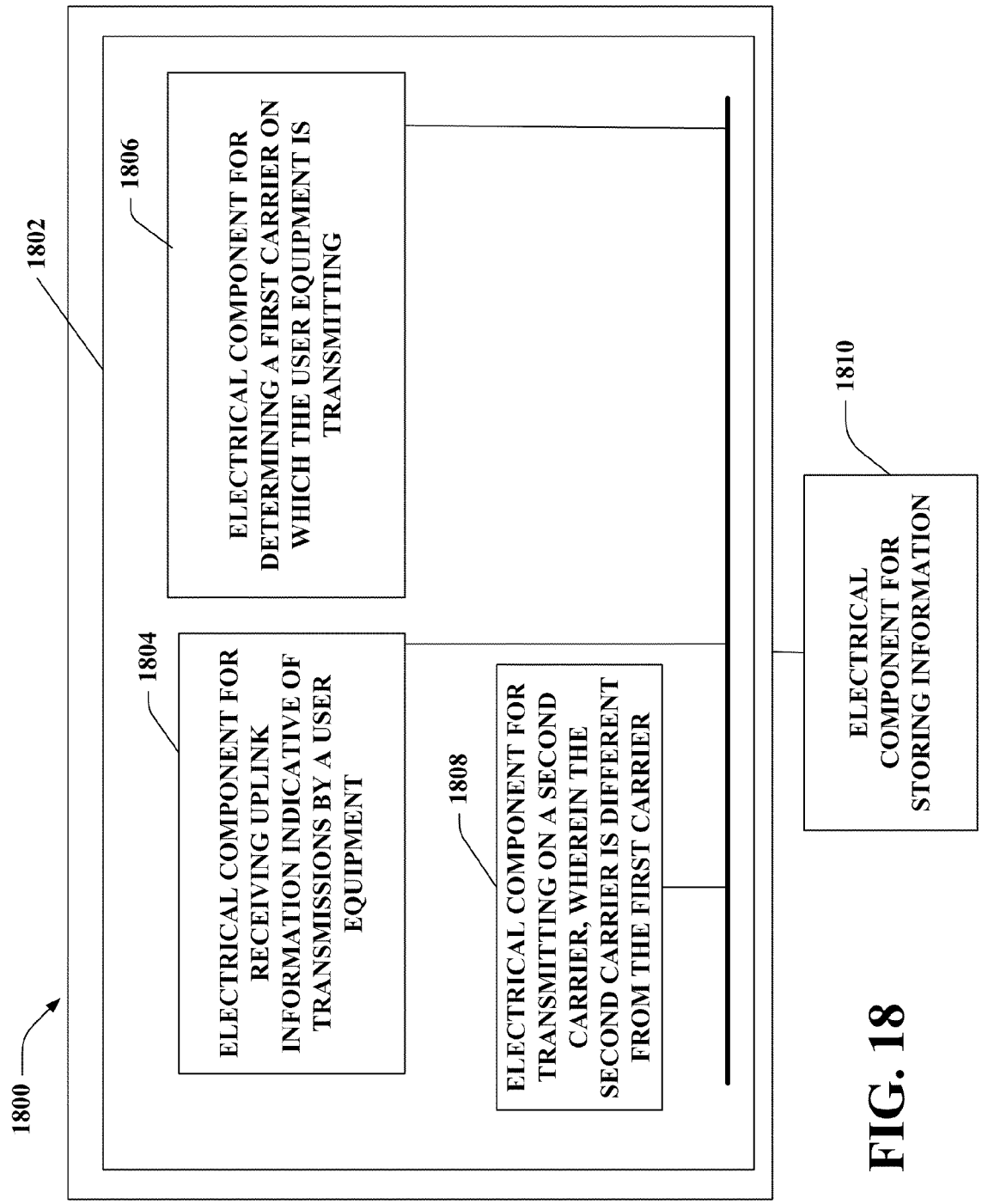

Turning now to FIG. 18, illustrated is a system for facilitating interference management. It is to be appreciated that system 1800 is represented as including functional blocks, which can be functional blocks that represent functions implemented by a processor, hardware, software, firmware, or combination thereof. System 1800 can include a logical grouping 1802 of electrical components that can act in conjunction.

For instance, logical grouping 1802 can include an electrical component 1804 for receiving UL information indicative of transmissions by a UE not served by the non-serving BS.

Logical grouping 1802 can include an electrical component 1806 for determining, for the UE not served by the non-serving BS, a first carrier on which the UE not served by the non-serving BS is transmitting, wherein the determining is based, at least, in part, on the UL information.

Logical grouping 1802 can include an electrical component 1808 for transmitting signals on a second carrier in response to determining that an unacceptable level of interference is present on the first carrier, wherein the second carrier is different than the first carrier.

Logical grouping 1802 can include a memory 1810 for storing slow time scale and/or fast time scale information, UL information about the UE.

A wireless multiple-access communication system can simultaneously support communication for multiple wireless access terminals. As mentioned above, each terminal can communicate with one or more BSs via transmissions on the forward and reverse links. The forward link (or DL) refers to the communication link from the BSs to the terminals, and the reverse link (or UL) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the BS to extract transmit beam-forming gain on the forward link when multiple antennas are available at the BS.

Figure 19:
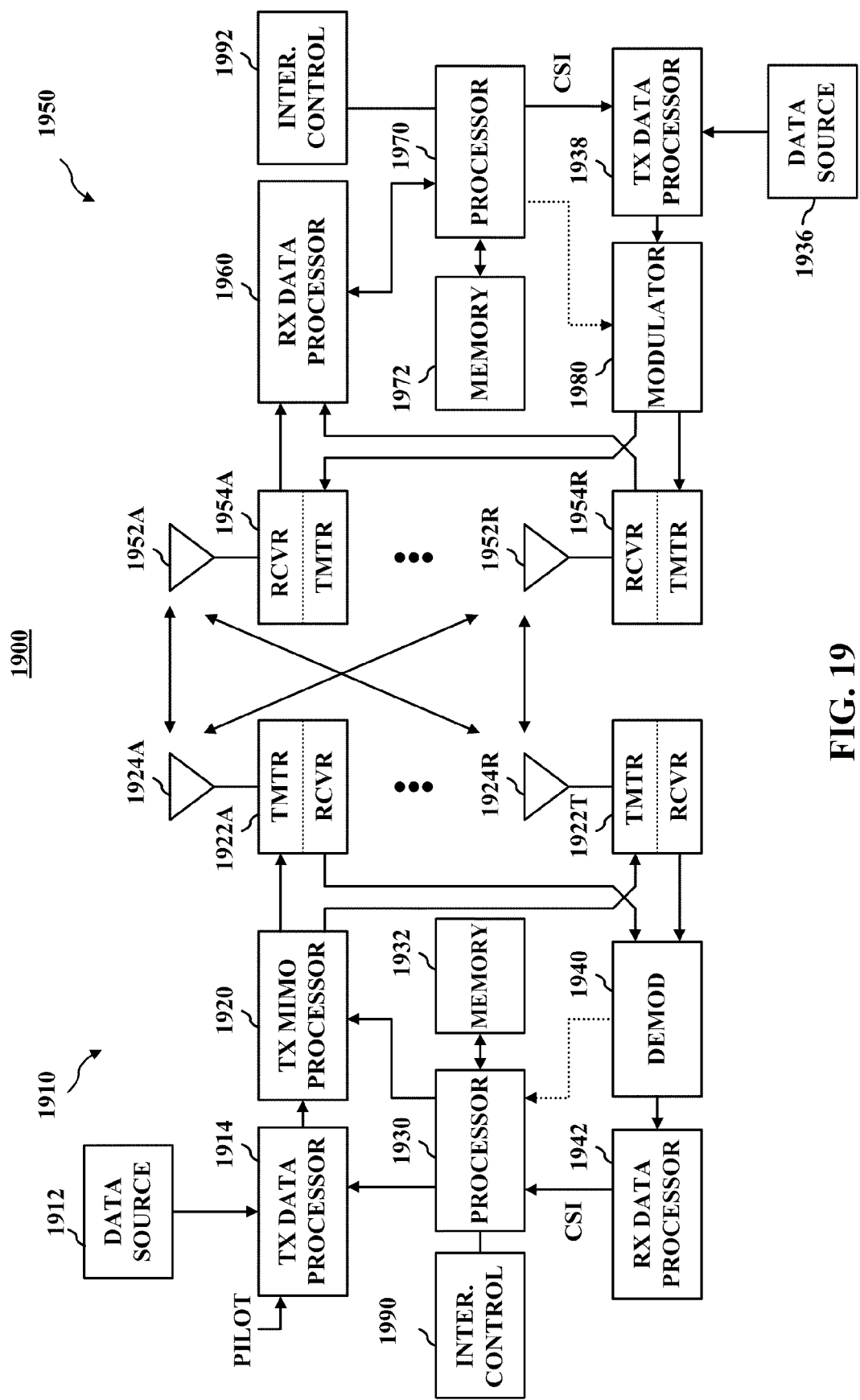
FIG. 19 shows an example wireless communication system in which the embodiments described herein can be employed in accordance with various aspects set forth herein.

FIG. 19 shows an example wireless communication system in which the embodiments described herein can be employed in accordance with various aspects set forth herein. The teachings herein may be incorporated into a node (e.g., a device) employing various components for communicating with at least one other node in the wireless communication system 1900. FIG. 19 depicts several sample components that may be employed to facilitate communication between nodes. Specifically, FIG. 19 illustrates a BS 1910 (e.g., an access point) and a wireless device 1950 (e.g., an access terminal) of a wireless communication system 1900 (e.g., multiple input multiple output (MIMO) system). At BS 1910, traffic data for a number of data streams is provided from a data source 1912 to a transmit (TX) data processor 1914.

In some aspects, each data stream is transmitted over a respective transmit antenna. The TX data processor 1914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase-shift keying (BPSK), quadrature phase-shift keying (QSPK), m-ary phase-shift keying (M-PSK), or multi-level quadrature amplitude modulation (M-QAM)) selected for that data stream to provide modulation symbols. The data rate, coding, and modulation for each data stream may be determined by instructions performed by a processor 1930. A data memory 1932 may store program code, data, and other information used by the processor 1930 or other components of the BS 1910.

The modulation symbols for all data streams are then provided to a TX MIMO processor 1920, which may further process the modulation symbols (e.g., for OFDM). The TX MIMO processor 1920 then provides $N_T$ modulation symbol streams to $N_T$ transceivers (XCVR) 1922A through 1922T. In some aspects, the TX MIMO processor 1920 applies beamforming weights to the symbols of the data streams and to the antenna from which the symbol is being transmitted.

Each transceiver 1922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1922A through 1922T are then transmitted from $N_T$ antennas 1924A through 1924T, respectively.

At the wireless device 1950, the transmitted modulated signals are received by $N_R$ antennas 1952A through 1952R and the received signal from each antenna 1952 is provided to a respective transceiver (XCVR) 1954A through 1954R. Each transceiver 1954 conditions (e.g., filters, amplifies, and downconverts) a respective received signal, digitizes the conditioned signal to provide samples, and further processes the samples to provide a corresponding "received" symbol stream.

A receive (RX) data processor 1960 then receives and processes the $N_R$ received symbol streams from $N_R$ transceivers 1954 based on a particular receiver processing technique to provide $N_T$ "detected" symbol streams. The RX data processor 1960 then demodulates, deinterleaves, and decodes each detected symbol stream to recover the traffic data for the data stream. The processing by the RX data processor 1960 is complementary to that performed by the TX MIMO processor 1920 and the TX data processor 1914 at the BS 1910.

A processor 1970 periodically determines which pre-coding matrix to use (discussed below). The processor 1970 formulates a reverse link message comprising a matrix index portion and a rank value portion. A data memory 1972 may store program code, data, and other information used by the processor 1970 or other components of the wireless device 1950.

The reverse link message may comprise various types of information regarding the communication link and/or the received data stream. The reverse link message is then processed by a TX data processor 1938, which also receives traffic data for a number of data streams from a data source 1936, modulated by a modulator 1980, conditioned by the transceivers 1954A through 1954R, and transmitted back to the BS 1910.

At the BS 1910, the modulated signals from the wireless device 1950 are received by the antennas 1924, conditioned by the transceivers 1922, demodulated by a demodulator (DEMOD) 1940, and processed by a RX data processor 1942 to extract the reverse link message transmitted by the wireless device 1950. The processor 1930 then determines which precoding matrix to use for determining the beam-forming weights then processes the extracted message.

FIG. 19 also illustrates that the communication components may include one or more components that perform interference control operations as taught herein. For example, an interference (INTER.) control component 1990 may cooperate with the processor 1930 and/or other components of the BS 1910 to send/receive signals to/from another device (e.g., wireless device 1950) as taught herein. Similarly, an interference control component 1992 may cooperate with the processor 1970 and/or other components of the wireless device 1950 to send/receive signals to/from another device (e.g., BS 1910). It should be appreciated that for each BS 1910 and wireless device 1950, the functionality of one or more of the described components may be provided by a single component. For example, a single processing component may provide the functionality of the interference control component 1990 and the processor 1930 and a single processing component may provide the functionality of the interference control component 1992 and the processor 1970.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive multimedia broadcast multicast service (MBMS) (e.g., old MCCH+MSCH). Additionally, the Logical Control Channels can include a Dedicated Control Channel (DCCH), which is a Point-to-point bi-directional channel that transmits dedicated control information and can be used by UEs having a radio resource control (RRC) connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MBMS traffic channel (MTCH) for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating interference management in a wireless communication system, the method comprising:
   receiving a message at a non-serving base station pertaining to a user equipment, wherein the user equipment is served by a serving base station and is not allowed to connect to the non-serving base station;
   disallowing access to the user equipment in response to the message, by the non-serving base station, due to restricted access rules for the non-serving base station indicating that the user equipment is not part of a subscriber group authorized to associate with the non-serving base station;

processing the message at the non-serving base station to obtain information about the user equipment served by the serving base station and disallowed access to the non-serving base station; and determining signal information at the non-serving base station based, at least, in part, on the information.

2. The method of claim 1, wherein the information is slow time scale information.

3. The method of claim 2, wherein the slow time scale information is provided in coordination information signaling, wherein coordination information is handover signaling.

4. The method of claim 3, wherein the message is received in response to at least one of:

the serving base station receiving, from the user equipment served by a serving base station, a measurement report about the non-serving base station, or the user equipment served by the serving base station attempting to connect to the non-serving base station, and the non-serving base station initiating steps to obtain the information.

5. The method of claim 4, wherein the measurement report includes at least one of: received signal strength indicator measurements, reference signal received power measurements or reference signal received quality measurements, and wherein the measurement report is indicative of at least one of the: received signal strength indicator measurements, reference signal received power measurements or reference signal received quality measurements being greater than a threshold.

6. The method of claim 1, further comprising performing interference management at the non-serving base station of the user equipment served by the serving base station, wherein the interference management is performed based, at least, in part, on a determined signal information.

7. The method of claim 6, wherein performing interference management comprises at least one of: canceling an uplink signal transmitted from the user equipment served by the serving base station, scheduling transmission of a signal on a carrier different than a carrier on which an uplink signal is scheduled from the user equipment served by the serving base station or performing power control for a user equipment served by the non-serving base station.

8. The method of claim 2, wherein the slow time scale information is at least one of: a scrambling code used by the user equipment or uplink channel configuration information for the user equipment, and wherein the uplink channel configuration information comprises at least one of an uplink dedicated physical channel or an enhanced dedicated physical channel, and wherein the wireless communication system is a Universal Mobile Telecommunications System.

9. The method of claim 2, wherein the slow time scale information is at least one of: a cell radio network temporary identifier associated with the user equipment, persistent assignment information for the user equipment, physical channel configuration information about the user equipment or a number of control channel symbols being used by the serving base station, and wherein the wireless communication system is a Long-Term Evolution system.

10. The method of claim 9, wherein the persistent assignment information for the user equipment is at least one of: assigned resource blocks, information indicative of periodicity of a persistent assignment associated with the user equipment, information indicative of modulation used in a persistent assignment associated with the user equipment, information indicative of a coding rate applicable to a persistent assignment associated with the user equipment or information indicative of hopping of a persistent assignment associated with the user equipment, and wherein physical channel configuration information about the user equipment comprises at least one of: a physical uplink control channel, a physical uplink shared channel or a sounding reference signal.

11. A non-transitory computer-readable medium, comprising:

codes for causing a computer to receive a message at a non-serving base station pertaining to a user equipment, wherein the user equipment is served by a serving base station and is not allowed to connect to the non-serving base station;

codes for causing the computer to disallow access to the user equipment in response to the message, by the non-serving base station, due to restricted access rules for the non-serving base station indicating that the user equipment is not part of a subscriber group authorized to associate with the non-serving base station;

codes for causing the computer to process the message at the non-serving base station to obtain information about the user equipment served by the serving base station and disallowed access to the non-serving base station; and codes for causing the computer to determine signal information at the non-serving base station based, at least, in part, on the information.

12. The non-transitory computer-readable medium of claim 11, wherein the information is slow time scale information.

13. The non-transitory computer-readable medium of claim 12, wherein the slow time scale information is provided in coordination information signaling, wherein coordination information is handover signaling.

14. The non-transitory computer-readable medium of claim 13, wherein the message is received in response to at least one of: the serving base station receiving, from the user equipment, a measurement report about the non-serving base station or the user equipment served by the serving base station attempting to connect to the non-serving base station, and the non-serving base station initiating steps to obtain the information.

15. The non-transitory computer-readable medium of claim 14, wherein the measurement report includes at least one of: received signal strength indicator measurements, reference signal received power measurements or reference signal received quality measurements, and wherein the measurement report is indicative of at least one of the: received signal strength indicator measurements, reference signal received power measurements or reference signal received quality measurements being greater than a threshold.

16. The non-transitory computer-readable medium of claim 11, further comprising:

codes for causing the computer to perform interference management at the non-serving base station of the user equipment served by the serving base station, wherein the interference management is performed based, at least, in part, on a determined signal information.

17. The non-transitory computer-readable medium of claim 16, wherein the codes for causing the computer to perform interference management comprise at least one of: codes for causing the computer to cancel an uplink signal transmitted from the user equipment served by the serving base station, codes for causing the computer to schedule transmission of a signal on a carrier different than a carrier on which an uplink signal is scheduled from the user equipment served by the serving base station or codes for causing the computer to perform power control for a user equipment served by the non-serving base station.

18. The non-transitory computer-readable medium of claim 12, wherein the slow time scale information is at least one of: a scrambling code used by the user equipment or uplink channel configuration information for the user equipment, and wherein the uplink channel configuration information comprises at least one of: an uplink dedicated physical channel or an enhanced dedicated physical channel, and wherein a wireless communication system providing the slow time scale information is a Universal Mobile Telecommunications System.

19. The non-transitory computer-readable medium of claim 12, wherein the slow time scale information is at least one of: a cell radio network temporary identifier associated with the user equipment, persistent assignment information for the user equipment, physical channel configuration information about the user equipment or a number of control channel symbols being used by the serving base station, and wherein a wireless communication system providing the slow time scale information is a Long-Term Evolution system.

20. The non-transitory computer-readable medium of claim 19, wherein the persistent assignment information for the user equipment is at least one of assigned resource blocks, information indicative of periodicity of a persistent assignment associated with the user equipment, information indicative of modulation used in a persistent assignment associated with the user equipment, information indicative of a coding rate applicable to a persistent assignment associated with the user equipment or information indicative of hopping of a persistent assignment associated with the user equipment, and wherein physical channel configuration information about the user equipment comprises at least one of: a physical uplink control channel, a physical uplink shared channel or a sounding reference signal.

21. An apparatus, comprising:
means for receiving a message at a non-serving base station pertaining to a user equipment, wherein the user equipment is served by a serving base station and is not allowed to connect to the non-serving base station;
means for disallowing access to the user equipment in response to the message due to restricted access rules for the non-serving base station indicating that the user equipment is not part of a subscriber group authorized to associate with the non-serving base station;
means for processing the message at the non-serving base station to obtain information about the user equipment served by the serving base station and disallowed access to the non-serving base station; and
means for determining signal information at the non-serving base station based, at least, in part, on the information.

22. The apparatus of claim 21, wherein the information is slow time scale information.

23. The apparatus of claim 22, wherein the slow time scale information is provided in coordination information signaling, wherein coordination information is handover signaling.

24. The apparatus of claim 23, wherein the message is received in response to at least one of:
the serving base station receiving, from the user equipment, a measurement report about the apparatus, and the serving base station transmitting the information to the non-serving base station, or
the user equipment served by the serving base station attempting to connect to the apparatus, and the apparatus initiating steps to obtain the information.

25. The apparatus of claim 24, wherein the measurement report includes at least one of: received signal strength indicator measurements, reference signal received power measurements or reference signal received quality measurements, and wherein the measurement report is indicative of at least one of the: received signal strength indicator measurements, reference signal received power measurements or reference signal received quality measurements being greater than a threshold.

26. The apparatus of claim 21, further comprising means for performing interference management of the user equipment served by the serving base station, wherein the interference management is performed based, at least, in part, on a determined signal information.

27. The apparatus of claim 26, wherein the means for performing interference management at the non-serving base station comprises at least one of: means for canceling an uplink signal transmitted from the user equipment served by the serving base station, means for scheduling transmission of a signal on a carrier different than a carrier on which an uplink signal is scheduled from the user equipment served by the serving base station or means for performing power control for a user equipment served by the serving base station.

28. The apparatus of claim 22, wherein the slow time scale information is at least one of a scrambling code used by the user equipment or uplink channel configuration information for the user equipment, and wherein the uplink channel configuration information comprises at least one of: an uplink dedicated physical channel or an enhanced dedicated physical channel, and wherein a wireless communication system providing the slow time scale information is a Universal Mobile Telecommunications System.

29. The apparatus of claim 22, wherein the slow time scale information is at least one of: a cell radio network temporary identifier associated with the user equipment, persistent assignment information for the user equipment, physical channel configuration information about the user equipment or a number of control channel symbols being used by the serving base station, and wherein a wireless communication system providing the slow time scale information is a Long-Term Evolution system.

30. The apparatus of claim 29, wherein the persistent assignment information for the user equipment is at least one of assigned resource blocks, information indicative of periodicity of a persistent assignment associated with the user equipment, information indicative of modulation used in a persistent assignment associated with the user equipment, information indicative of a coding rate applicable to a persistent assignment associated with the user equipment or information indicative of hopping of a persistent assignment associated with the user equipment, and wherein physical channel configuration information about the user equipment comprises at least one of: a physical uplink control channel, a physical uplink shared channel or a sounding reference signal.

31. An apparatus, comprising:
a non-serving base station configured to:
receive a message pertaining to a user equipment, wherein the user equipment is served by a serving base station and is not allowed to connect to the non-serving base station;
disallow access to the user equipment in response to the message due to restricted access rules for the non-serving base station indicating that the user equipment is not part of a subscriber group authorized to associate with the non-serving base station;

process the message to obtain information about the user equipment served by the serving base station and disallowed access to the non-serving base station; and determine signal information based, at least, in part, on the information.

32. The apparatus of claim 31, wherein the information is slow time scale information.

33. The apparatus of claim 32, wherein the slow time scale information is provided in coordination information signaling, wherein coordination information is handover signaling.

34. The apparatus of claim 33, wherein the message is received in response to at least one of: the serving base station receiving, from the user equipment, a measurement report about the non-serving base station, and the serving base station transmitting the information to the non-serving base station or the user equipment served by the serving base station attempting to connect to the non-serving base station, and the non-serving base station initiating steps to obtain the information.

35. The apparatus of claim 34, wherein the measurement report includes at least one of: received signal strength indicator measurements, reference signal received power measurements or reference signal received quality measurements, and wherein the measurement report is indicative of at least one of the: received signal strength indicator measurements, reference signal received power measurements or reference signal received quality measurements being greater than a threshold.

36. The apparatus of claim 31, wherein the non-serving base station is further configured to perform interference management at the non-serving base station of the user equipment served by the serving base station, wherein the interference management is performed based, at least, in part, on a determined signal information.

37. The apparatus of claim 36, wherein the non-serving base station being configured to perform the interference management comprises at least one of: the non-serving base station being configured to cancel an uplink signal transmitted from the user equipment served by the serving base station, the non-serving base station being configured to schedule transmission of a signal on a carrier different than a carrier on which an uplink signal is scheduled from the user equipment served by the serving base station or the non-serving base station being configured to perform power control for a user equipment served by the serving base station.

38. The apparatus of claim 32, wherein the slow time scale information is at least one of a scrambling code used by the user equipment or uplink channel configuration information for the user equipment, and wherein the uplink channel configuration information comprises at least one of: an uplink dedicated physical channel or an enhanced dedicated physical channel, and wherein a wireless communication system providing the slow time scale information is a Universal Mobile Telecommunications System.

39. The apparatus of claim 32, wherein the slow time scale information is at least one of: a cell radio network temporary identifier associated with the user equipment, persistent assignment information for the user equipment, physical channel configuration information about the user equipment or a number of control channel symbols being used by the serving base station, and wherein a wireless communication system providing the slow time scale information is a Long-Term Evolution system.

40. The apparatus of claim 39, wherein the persistent assignment information for the user equipment is at least one of assigned resource blocks, information indicative of periodicity of a persistent assignment associated with the user equipment, information indicative of modulation used in a persistent assignment associated with the user equipment, information indicative of a coding rate applicable to a persistent assignment associated with the user equipment or information indicative of hopping of a persistent assignment associated with the user equipment, and wherein physical channel configuration information about the user equipment comprises at least one of: a physical uplink control channel, a physical uplink shared channel or a sounding reference signal.

41. The method of claim 1, wherein the non-serving base station serves a closed subscriber group (CSG) that does not include the user equipment and prevents the non-serving base station from allowing an association with the user equipment.

* * * * *